US012749181B2

(12) United States Patent
Du et al.

(10) Patent No.: US 12,749,181 B2
(45) Date of Patent: Sep. 29, 2026

(54) METHODS AND RELATED ASPECTS FOR CLASSIFYING LESIONS IN MEDICAL IMAGES

(71) Applicant: THE JOHNS HOPKINS UNIVERSITY, Baltimore, MD (US)

(72) Inventors: Yong Du, Lutherville-Timonium, MD (US); Martin Gilbert Pomper, Baltimore, MD (US); Steven P. Rowe, Parkville, MD (US); Kevin H. Leung, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 231 days.

(21) Appl. No.: 18/277,280

(22) PCT Filed: Feb. 18, 2022

(86) PCT No.: PCT/US2022/017104
§ 371 (c)(1),
(2) Date: Aug. 15, 2023

(87) PCT Pub. No.: WO2022/178329
PCT Pub. Date: Aug. 25, 2022

(65) Prior Publication Data
US 2024/0127433 A1 Apr. 18, 2024

Related U.S. Application Data

(60) Provisional application No. 63/152,076, filed on Feb. 22, 2021.

(51) Int. Cl.
*G06T 7/00* (2017.01)

(52) U.S. Cl.
CPC ........................ *G06T 7/0012* (2013.01); *G06T 2207/10081* (2013.01); *G06T 2207/10104* (2013.01);
(Continued)

(58) Field of Classification Search
CPC ......... G06T 7/0012; G06T 2207/20081; G06T 2207/30096; G06T 2207/10081;
(Continued)

(56) References Cited

U.S. PATENT DOCUMENTS

| | | | | |
|---|---|---|---|---|
| 9,536,054 B1 * | 1/2017 | Podilchuk | .......... | A61B 10/0041 |
| 2004/0171924 A1 | 9/2004 | Mire et al. | | |

(Continued)

FOREIGN PATENT DOCUMENTS

| | | | | |
|---|---|---|---|---|
| RU | 2607958 C1 | 1/2017 | | |
| WO | WO-2011077303 A1 * | 6/2011 | ............. | G06T 7/149 |
| WO | WO-2020224406 A1 * | 11/2020 | ........... | G06V 10/806 |

OTHER PUBLICATIONS

Rowe, Steven P., et al. "Proposal for a structured reporting system for prostate-specific membrane antigen-targeted PET imaging: PSMA-RADS version 1.0." Journal of Nuclear Medicine 59.3 (2018): 479-485 (Year: 2018).*

(Continued)

*Primary Examiner* — Courtney Joan Nelson
(74) *Attorney, Agent, or Firm* — MH2 Technology Law Group LLP

(57) ABSTRACT

Provided herein are methods of classifying lesions in medical image of subjects in certain embodiments. Related systems and computer program products are also provided.

18 Claims, 23 Drawing Sheets

(52) U.S. Cl.
CPC ............... *G06T 2207/20084* (2013.01); *G06T 2207/30081* (2013.01); *G06T 2207/30096* (2013.01)

(58) Field of Classification Search
CPC ........................ G06T 2207/10104; G06T 7/40; G06T 7/11; G06T 2207/30081; G06T 7/00; G06T 7/10; G06T 2210/41; G06T 7/73; G06T 2207/30004; G06T 2207/20084; G06T 2207/20104; G06T 7/13; G16H 50/20; G16H 30/40; G16H 50/30; G16H 30/20; G16H 70/60; A61B 6/5217; A61B 6/032; A61B 5/7267; A61B 5/4842; A61B 5/4381; G06N 20/00; G06N 3/045; G06N 3/0464; G06N 3/02; G06V 10/82; G06V 2201/03; G06V 10/44; G06V 10/25
See application file for complete search history.

(56) References Cited

U.S. PATENT DOCUMENTS

| | | | | |
|---|---|---|---|---|
| 2012/0022793 | A1* | 1/2012 | Barker ............. | G01N 33/57434 702/19 |
| 2015/0110716 | A1* | 4/2015 | Armor ............... | A61K 51/0478 424/1.65 |
| 2015/0279060 | A1 | 10/2015 | Grady et al. | |
| 2016/0059385 | A1 | 3/2016 | Kondo et al. | |
| 2017/0200067 | A1 | 7/2017 | Zhou et al. | |
| 2019/0156477 | A1* | 5/2019 | Perrin ................... | G06T 7/0012 |

OTHER PUBLICATIONS

Moazemi, S.; Khurshid, Z.; Erle, A.; Lütje, S.; Essler, M.; Schultz, T.; Bundschuh, R.A. Machine Learning Facilitates Hotspot Classification in PSMA-PET/CT with Nuclear Medicine Specialist Accuracy. Diagnostics 2020, 10, 622. https://doi.org/10.3390/diagnostics10090622 (Year: 2020).*
Machine translation from google patents of WO-2020224406-A1 (Year: 2020).*
Ivanova, T. (Authorized officer), International Search Report and Written Opinion in corresponding International Application No. PCT/US2022/017104 mailed on Jun. 2, 2022, 7 pages.
Tang, X. (Authorized officer), International Preliminary Report on Patentability in corresponding International Application No. PCT/US2022/017104 mailed on Aug. 31, 2023, 6 pages.
Kumar, Ashnil, et al. "An ensemble of fine-tuned convolutional neural networks for medical image classification." IEEE journal of biomedical and health informatics 21.1 (2016): 31-40.
Cao, Yue, et al. "Ensemble deep learning in bioinformatics." Nature Machine Intelligence 2.9 (2020): 500-508.
Cysouw, Matthijs CF, et al. "Machine learning-based analysis of [18F] DCFPyL PET radiomics for risk stratification in primary prostate cancer." European journal of nuclear medicine and molecular imaging 48.2 (2021): 340-349.
Esteva, Andre, et al. "Dermatologist-level classification of skin cancer with deep neural networks." nature 542.7639 (2017): 115-118.
Gulshan, Varun, et al. "Development and validation of a deep learning algorithm for detection of diabetic retinopathy in retinal fundus photographs." jama 316.22 (2016): 2402-2410.
Hartenstein, Alexander, et al. "Prostate cancer nodal staging: using deep learning to predict 68Ga-PSMA-positivity from CT imaging alone." Scientific reports 10.1 (2020): 3398.
Hosny, Ahmed, et al. "Artificial intelligence in radiology." Nature Reviews Cancer 18.8 (2018): 500-510.
Kazuhiro, Koshino, et al. "Generative adversarial networks for the creation of realistic artificial brain magnetic resonance images." Tomography 4.4 (2018): 159.
King, Gary, et al. "Logistic regression in rare events data." Political analysis 9.2 (2001): 137-163.
Kingma, Diederik P., et al. "Adam: A method for stochastic optimization." arXiv preprint arXiv: 1412.6980 (2014).
Leung, Kevin, et al. "A fully automated deep-learning based method for lesion segmentation in 18F-DCFPyL Psma Pet images of patients with prostate cancer." (2019): 399-399.
Leung, Kevin, et al. "A physics-guided modular deep-learning based automated framework for tumor segmentation in PET." Physics in Medicine & Biology 65.24 (2020): 245032.
Litwin, Mark S., et al. "The diagnosis and treatment of prostate cancer: a review." Jama 317.24 (2017): 2532-2542.
Maurer, Tobias, et al. "Current use of PSMA-PET in prostate cancer management." Nature Reviews Urology 13.4 (2016): 226-235.
Mehta, Pankaj, et al. "A high-bias, low-variance introduction to machine learning for physicists." Physics reports 810 (2019): 1-124.
Phillips, Ryan, et al. "Outcomes of observation vs stereotactic ablative radiation for oligometastatic prostate cancer: the ORIOLE phase 2 randomized clinical trial." JAMA oncology 6.5 (2020): 650-659.
Polikar, Robi. "Ensemble learning." Ensemble machine learning. Springer, New York, NY, 2012. 1-34.
Pozaruk, Andrii, et al. "Augmented deep learning model for improved quantitative accuracy of MR-based PET attenuation correction in Psma Pet-Mri prostate imaging." European journal of nuclear medicine and molecular imaging 48.1 (2021): 9-20.
Rowe, Steven P., et al. "PSMA-RADS version 1.0: a step towards standardizing the interpretation and reporting of PSMA-targeted PET imaging studies." European urology 73.4 (2017): 485.
Sheikhbahaei, Sara, et al. "Pearls and pitfalls in clinical interpretation of prostate-specific membrane antigen (PSMA)-targeted PET imaging." European journal of nuclear medicine and molecular imaging 44.12 (2017): 2117-2136.
Sheikhbahaei, Sara, et al. "Prostate-specific membrane antigen (PSMA)-targeted PET imaging of prostate cancer: an update on important pitfalls." Seminars in nuclear medicine. Vol. 49. No. 4. WB Saunders, 2019.
Siegel, Rebecca L., et al. "Cancer statistics, 2018." CA: a cancer journal for clinicians 68.1 (2018).
Aueb, Titsias RC. "One-vs-each approximation to softmax for scalable estimation of probabilities." Advances in Neural Information Processing Systems 29 (2016).
Vial, Alanna, et al. "The role of deep learning and radiomic feature extraction in cancer-specific predictive modelling: a review." Translational Cancer Research 7.3 (2018).
Werner, Rudolf A., et al. "Interobserver agreement for the standardized reporting system PSMA-RADS 1.0 on 18F-DCFPyL PET/CT imaging." Journal of Nuclear Medicine 59.12 (2018): 1857-1864.
Zhao, Yu, et al. "Deep neural network for automatic characterization of lesions on 68Ga-PSMA-11 PET/CT." European journal of nuclear medicine and molecular imaging 47.3 (2020): 603-613.

* cited by examiner

METHODS AND RELATED ASPECTS FOR CLASSIFYING LESIONS IN MEDICAL IMAGES

CROSS-REFERENCE TO RELATED APPLICATIONS

This application is the national stage entry of International Patent Application No. PCT/US2022/017104, filed on Feb. 18, 2022, and published as WO 2022/178329 A1 on Aug. 25, 2022, which claims the benefit of U.S. Provisional Patent Application Ser. No. 63/152,076, filed Feb. 22, 2021, both of which are hereby incorporated by reference herein in their entireties.

BACKGROUND

Cancer is a major cause of death in the United States. In particular, prostate cancer (PCa) is one of the most common forms of malignancy in males and is a leading cause of cancer death. Interest has grown in molecular imaging using positron emission tomography (PET) to diagnose prostate cancer. Several PET imaging probes have been developed targeting prostate-specific membrane antigen (PSMA), which is a transmembrane glycoprotein that is overexpressed in PCa, for imaging and directing therapy of PCa.

There are several radiotracer-avid and non-avid pitfalls with PSMA PET imaging. Thus, accurate classification of lesions with or without uptake from PSMA PET images is an important clinical need for the diagnosis and prognosis of PCa. To address this, a PSMA-reporting and data systems (PSMA-RADS version 1.0) was developed to classify PSMA-targeted PET scans and individual findings on these studies. The PSMA-RADS framework categories reflect the probability of PCa. The PSMA-RADS framework is on a 5-point scale where a higher score indicates a greater likelihood of PCa. The categorization of a lesion by the PSMA-RADS framework is informed by the intensity of radiotracer uptake, anatomical location, the distribution and burden of other lesions, as well as the clinical history of the patient.

Medical images are typically visually evaluated by trained radiologists and physicians for the diagnosis and monitoring of diseases. However, this manual process is often tedious, time-consuming, expensive and subject to inter- and intra-operator variability. The use of automated machine learning (ML) methods for characterizing diseases in medical images has significant advantages over such manual evaluation, including more reliable and consistent extraction of radiomic features and accurate classification and diagnosis of diseases.

Radiomics is the process of automatic extraction of clinically relevant features from radiologic data that is difficult for humans to visually perceive and is a rapidly advancing field. Recent work using a radiomics-based machine learning approach has shown promise in risk stratification in patients with primary prostate cancer. Deep learning (DL) methods have also shown substantial promise in medical image analysis tasks.

Several applications using DL have been developed for PSMA PET. Such applications include using DL-based methods for estimating attenuation maps from Mill contrast images for PSMA PET/MRI, detecting bone and lymph node lesions in $^{68}$Ga-PSMA PET/CT images, and determining $^{68}$Ga-PSMA-PET/CT lymph node status from CT images. However, applying DL-based methods in PET is challenging due to the relatively low resolution and high noise in PET especially when compared to anatomical imaging. Another challenge is that DL methods also typically need very large training data to train deep neural networks on various image analysis tasks.

Additionally, DL methods suffer from a lack of interpretability due to the black-box nature of deep neural networks (DNNs). It has also been shown that while DNNs have had improved levels of accuracy in recent years, modern DNNs are not well-calibrated and tend to be overconfident in their predictions. Reliable confidence estimates are highly important for model interpretability and could assist physicians in facilitating clinical decisions. As such, there is an important need for interpretable DL methods that provide well-calibrated confidence measures.

DL methods also often suffer from high variance in prediction due to the nonlinearity of neural networks and high model complexity. Ensemble learning methods have been developed to improve the accuracy of prediction tasks by combining multiple classifier systems to reduce the variance in prediction. Ensemble learning combined with DL-based methods have been developed for medical imaging applications. For instance, an ensemble DL method was developed for red lesion detection in fundus images where features extracted by a convolutional neural network (CNN) and hand-crafted features were combined and input into a random forest classifier. Another work used an ensemble of two commonly used CNN architectures in combination with a softmax and support vector machine (SVM) classifiers for the medical image classification task across several imaging modalities. Additionally, ensemble deep learning has been applied in bioinformatics research.

Accordingly, there is a need for additional methods, and related aspects, for classifying PSMA-targeted PET images.

SUMMARY

The present disclosure relates, in certain aspects, to methods, systems, and computer readable media of use in classifying PSMA-targeted PET images. Some embodiments provide an automated framework that combines both DL and radiomics extracted image features for lesion classification in $^{18}$F-DCFPyL PSMA-targeted PET images of patients with PCa or suspected of having PCa. Some embodiments provide an ensemble-based framework that utilizes both DL and radiomics for lesion classification in $^{18}$F-DCFPyL PSMA-targeted PET images of patients with PCa or suspected of having PCa. These and other aspects will be apparent upon a complete review of the present disclosure, including the accompanying figures.

In one aspect, the present disclosure provides a method of classifying a lesion in a medical image of a subject. The method includes extracting one or more image features from at least one region-of-interest (ROI) that comprises the lesion in at least one slice of a positron emission tomography (PET) and/or computed tomography (CT) image of at least a portion of the subject using a convolutional neural network (CNN) to generate CNN-extracted image feature data. The method also includes extracting one or more radiomic features from the PET and/or CT image to generate radiomic feature data and combining the CNN-extracted image feature data and the radiomic feature data with anatomical location information about the lesion to generate combined information. In addition, the method also includes inputting the combined information into an artificial neural network (ANN) that classifies the lesion in the PET and/or CT image using the combined information to generate a classification, thereby classifying the lesion in the medial image of the subject.

In another aspect, the present disclosure provides a method of classifying a lesion in a medical image of a subject. The method includes inputting at least one slice of a positron emission tomography (PET) and/or computed tomography (CT) image of at least a portion of the subject that comprises the lesion and at least one segmentation of the lesion as a binary mask into an ensemble of convolutional neural networks (CNNs). The method also includes extracting one or more image features from at least one region-of-interest (ROI) from the slice of the PET and/or CT image using the ensemble of CNNs to generate CNN-extracted image feature data, and extracting one or more radiomic features from the PET and/or CT image to generate radiomic feature data. In addition, the method also includes combining the CNN-extracted image feature data and the radiomic feature data with anatomical location information about the lesion to generate combined information, and inputting the combined information into an artificial neural network (ANN) that classifies the lesion in the PET and/or CT image using the combined information to generate a classification, thereby classifying the lesion in the medial image of the subject.

In another aspect, the present disclosure provides a method of treating a disease in a subject. The method includes extracting one or more image features from at least one region-of-interest (ROI) that comprises the lesion in at least one slice of a positron emission tomography (PET) and/or computed tomography (CT) image of at least a portion of the subject using a convolutional neural network (CNN) to generate CNN-extracted image feature data. The method also includes extracting one or more radiomic features from the PET and/or CT image to generate radiomic feature data, and combining the CNN-extracted image feature data and the radiomic feature data with anatomical location information about the lesion to generate combined information. In addition, the method also includes inputting the combined information into an artificial neural network (ANN) that classifies the lesion in the PET and/or CT image using the combined information to generate a classification, and administering, or discontinuing administering, one or more therapies to the subject based at least in part upon the classification, thereby treating the disease in the subject.

In another aspect, the present disclosure provides a method of treating a disease in a subject. The method includes administering, or discontinuing administering, one or more therapies to the subject based at least in part upon a classification, wherein the classification is produced by: extracting one or more image features from at least one region-of-interest (ROI) that comprises the lesion in at least one slice of a positron emission tomography (PET) and/or computed tomography (CT) image of at least a portion of the subject using a convolutional neural network (CNN) to generate CNN-extracted image feature data; extracting one or more radiomic features from the PET and/or CT image to generate radiomic feature data; combining the CNN-extracted image feature data and the radiomic feature data with anatomical location information about the lesion to generate combined information; and, inputting the combined information into an artificial neural network (ANN) that classifies the lesion in the PET and/or CT image using the combined information to generate a classification.

In another aspect, the present disclosure provides a method of treating a disease in a subject. The method includes inputting at least one slice of a positron emission tomography (PET) and/or computed tomography (CT) image of at least a portion of the subject that comprises the lesion and at least one segmentation of the lesion as a binary mask into an ensemble of convolutional neural networks (CNNs). The method also includes extracting one or more image features from at least one region-of-interest (ROI) from the slice of the PET and/or CT image using the ensemble of CNNs to generate CNN-extracted image feature data, extracting one or more radiomic features from the PET and/or CT image to generate radiomic feature data, and combining the CNN-extracted image feature data and the radiomic feature data with anatomical location information about the lesion to generate combined information. In addition, the method also includes inputting the combined information into an artificial neural network (ANN) that classifies the lesion in the PET and/or CT image using the combined information to generate a classification, and administering, or discontinuing administering, one or more therapies to the subject based at least in part upon the classification, thereby treating the disease in the subject.

In another aspect, the present disclosure provides a method of treating a disease in a subject, the method comprising administering, or discontinuing administering, one or more therapies to the subject based at least in part upon a classification, wherein the classification is produced by: inputting at least one slice of a positron emission tomography (PET) and/or computed tomography (CT) image of at least a portion of the subject that comprises the lesion and at least one segmentation of the lesion as a binary mask into an ensemble of convolutional neural networks (CNNs); extracting one or more image features from at least one region-of-interest (ROI) from the slice of the PET and/or CT image using the ensemble of CNNs to generate CNN-extracted image feature data; extracting one or more radiomic features from the PET and/or CT image to generate radiomic feature data; combining the CNN-extracted image feature data and the radiomic feature data with anatomical location information about the lesion to generate combined information; and inputting the combined information into an artificial neural network (ANN) that classifies the lesion in the PET and/or CT image using the combined information to generate a classification, thereby treating the disease in the subject.

In some embodiments of the methods disclosed herein, the PET and/or CT image comprises a $^{18}$F-DCFPyL PET and/or CT image. In some embodiments of the methods disclosed herein, the subject has, or is suspected of having, prostate cancer. In some embodiments of the methods disclosed herein, the medical image comprises of a prostate of the subject. In some embodiments of the methods disclosed herein, the classification comprises outputting a predicted likelihood that the lesion is in a given prostate-specific membrane antigen reporting and data system (PSMA-RADS) class. In some embodiments of the methods disclosed herein, the classification comprises a confidence score.

In some embodiments of the methods disclosed herein, the ROI is cropped substantially around the lesion. In some embodiments of the methods disclosed herein, the ROI comprises a delineated lesion ROI and/or a circular ROI. In some embodiments of the methods disclosed herein, the radiomic features are extracted from the ROI. In some embodiments of the methods disclosed herein, the slice comprises a full field-of-view (FOV). In some embodiments of the methods disclosed herein, the slice is an axial slice. In some embodiments of the methods disclosed herein, the ANN is fully-connected.

In some embodiments of the methods disclosed herein, the anatomical location information comprises a bone, a prostate, a soft tissue, and/or a lymphadenopathy. In some embodiments, the methods disclosed herein include classifying multiple lesions in the subject. In some embodiments, the methods disclosed herein include performing the classification on a per-slice, a per-lesion, and/or a per-patient basis. In some embodiments, the methods disclosed herein include inputting at least one manual segmentation of the lesion as a binary mask when using the CNN to extract the image features from the ROI. In some embodiments of the methods disclosed herein, the ensemble of CNNs comprises 2, 3, 4, 5, 6, 7, 8, 9, 10, or more submodels.

In another aspect, the present disclosure provides a system that includes at least one controller that comprises, or is capable of accessing, computer readable media comprising non-transitory computer executable instructions which, when executed by at least one electronic processor, perform at least: extracting one or more image features from at least one region-of-interest (ROI) that comprises the lesion in at least one slice of a positron emission tomography (PET) and/or computed tomography (CT) image of at least a portion of a subject using a convolutional neural network (CNN) to generate CNN-extracted image feature data; extracting one or more radiomic features from the PET and/or CT image to generate radiomic feature data; combining the CNN-extracted image feature data and the radiomic feature data with anatomical location information about the lesion to generate combined information; and inputting the combined information into an artificial neural network (ANN) that classifies the lesion in the PET and/or CT image using the combined information to generate a classification.

In another aspect, the present disclosure provides a system that includes at least one controller that comprises, or is capable of accessing, computer readable media comprising non-transitory computer executable instructions which, when executed by at least one electronic processor, perform at least: inputting at least one slice of a positron emission tomography (PET) and/or computed tomography (CT) image of at least a portion of a subject that comprises the lesion and at least one segmentation of the lesion as a binary mask into an ensemble of convolutional neural networks (CNNs); extracting one or more image features from at least one region-of-interest (ROI) from the slice of the PET and/or CT image using the ensemble of CNNs to generate CNN-extracted image feature data; extracting one or more radiomic features from the PET and/or CT image to generate radiomic feature data; combining the CNN-extracted image feature data and the radiomic feature data with anatomical location information about the lesion to generate combined information; and inputting the combined information into an artificial neural network (ANN) that classifies the lesion in the PET and/or CT image using the combined information to generate a classification.

In another aspect, the present disclosure provides a computer readable media comprising non-transitory computer executable instruction which, when executed by at least electronic processor perform at least: extracting one or more image features from at least one region-of-interest (ROI) that comprises the lesion in at least one slice of a positron emission tomography (PET) and/or computed tomography (CT) image of at least a portion of a subject using a convolutional neural network (CNN) to generate CNN-extracted image feature data; extracting one or more radiomic features from the PET and/or CT image to generate radiomic feature data; combining the CNN-extracted image feature data and the radiomic feature data with anatomical location information about the lesion to generate combined information; and inputting the combined information into an artificial neural network (ANN) that classifies the lesion in the PET and/or CT image using the combined information to generate a classification.

In another aspect, the present disclosure provides a computer readable media comprising non-transitory computer executable instruction which, when executed by at least electronic processor perform at least: inputting at least one slice of a positron emission tomography (PET) and/or computed tomography (CT) image of at least a portion of a subject that comprises the lesion and at least one segmentation of the lesion as a binary mask into an ensemble of convolutional neural networks (CNNs); extracting one or more image features from at least one region-of-interest (ROI) from the slice of the PET and/or CT image using the ensemble of CNNs to generate CNN-extracted image feature data; extracting one or more radiomic features from the PET and/or CT image to generate radiomic feature data; combining the CNN-extracted image feature data and the radiomic feature data with anatomical location information about the lesion to generate combined information; and inputting the combined information into an artificial neural network (ANN) that classifies the lesion in the PET and/or CT image using the combined information to generate a classification.

BRIEF DESCRIPTION OF THE DRAWINGS

The accompanying drawings, which are incorporated in and constitute a part of this specification, illustrate certain embodiments, and together with the written description, serve to explain certain principles of the methods, systems, and related computer readable media disclosed herein. The description provided herein is better understood when read in conjunction with the accompanying drawings which are included by way of example and not by way of limitation. It will be understood that like reference numerals identify like components throughout the drawings, unless the context indicates otherwise. It will also be understood that some or all of the figures may be schematic representations for purposes of illustration and do not necessarily depict the actual relative sizes or locations of the elements shown.

DEFINITIONS

Figure 1:
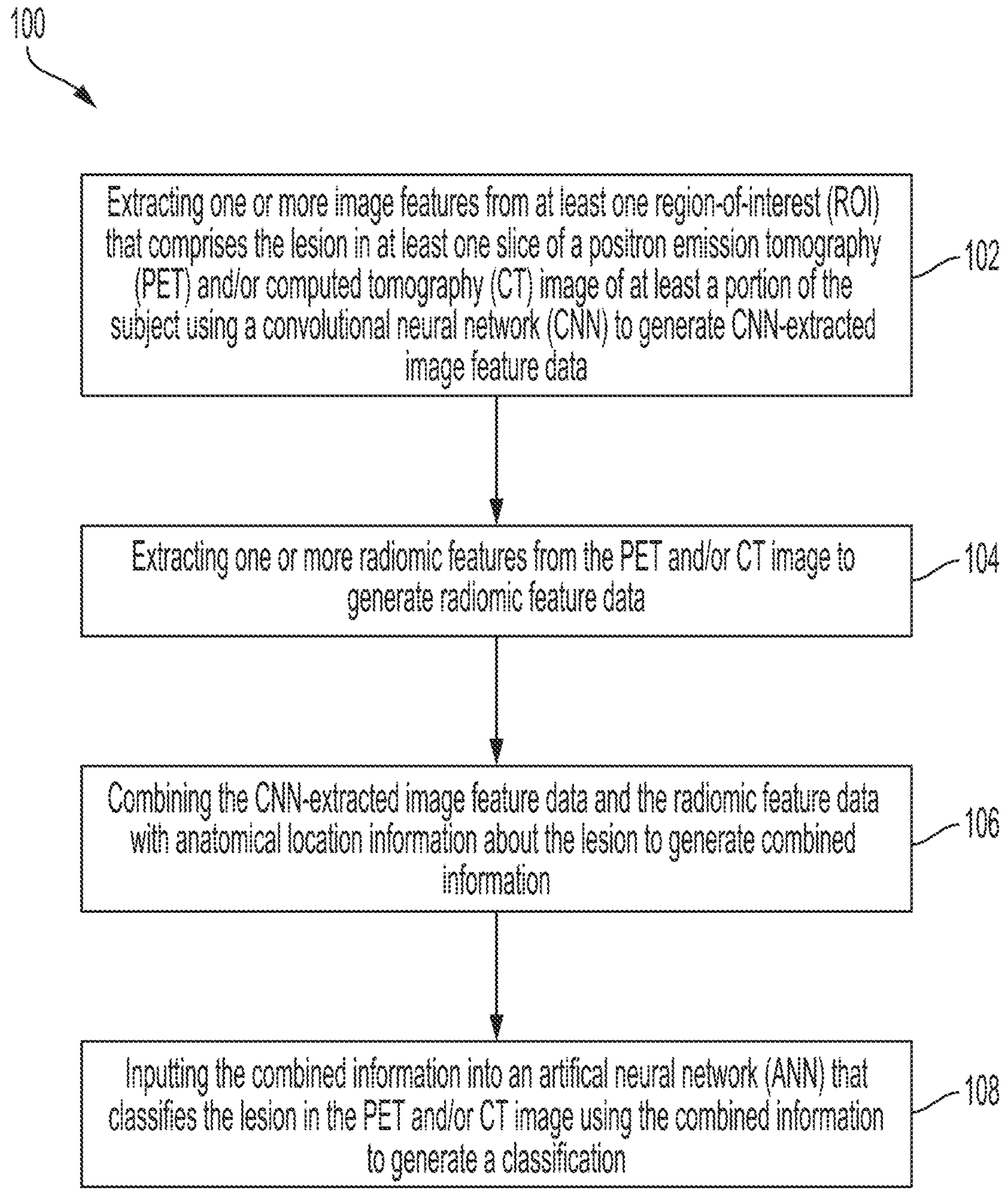
FIG. 1 is a flow chart that schematically depicts exemplary method steps according to some aspects disclosed herein.

In order for the present disclosure to be more readily understood, certain terms are first defined below. Additional definitions for the following terms and other terms may be set forth through the specification. If a definition of a term set forth below is inconsistent with a definition in an application or patent that is incorporated by reference, the definition set forth in this application should be used to understand the meaning of the term.

As used in this specification and the appended claims, the singular forms “a,” “an,” and “the” include plural references unless the context clearly dictates otherwise. Thus, for example, a reference to “a method” includes one or more methods, and/or steps of the type described herein and/or which will become apparent to those persons skilled in the art upon reading this disclosure and so forth.

It is also to be understood that the terminology used herein is for the purpose of describing particular embodiments only and is not intended to be limiting. Further, unless defined otherwise, all technical and scientific terms used herein have the same meaning as commonly understood by one of ordinary skill in the art to which this disclosure pertains. In describing and claiming the methods, computer readable media, systems, and component parts, the following terminology, and grammatical variants thereof, will be used in accordance with the definitions set forth below.

About: As used herein, “about” or “approximately” or “substantially” as applied to one or more values or elements of interest, refers to a value or element that is similar to a stated reference value or element. In certain embodiments, the term “about” or “approximately” or “substantially” refers to a range of values or elements that falls within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value or element unless otherwise stated or otherwise evident from the context (except where such number would exceed 100% of a possible value or element).

Machine Learning Algorithm: As used herein, “machine learning algorithm” generally refers to an algorithm, executed by computer, that automates analytical model building, e.g., for clustering, classification or pattern recognition. Machine learning algorithms may be supervised or unsupervised. Learning algorithms include, for example, artificial neural networks (e.g., back propagation networks), discriminant analyses (e.g., Bayesian classifier or Fisher’s analysis), support vector machines, decision trees (e.g., recursive partitioning processes such as CART-classification and regression trees, or random forests), linear classifiers (e.g., multiple linear regression (MLR), partial least squares (PLS) regression, and principal components regression), hierarchical clustering, and cluster analysis. A dataset on which a machine learning algorithm learns can be referred to as “training data.” A model produced using a machine learning algorithm is generally referred to herein as a “machine learning model.”

Subject: As used herein, “subject” or “test subject” refers to an animal, such as a mammalian species (e.g., human) or avian (e.g., bird) species. More specifically, a subject can be a vertebrate, e.g., a mammal such as a mouse, a primate, a simian or a human. Animals include farm animals (e.g., production cattle, dairy cattle, poultry, horses, pigs, and the like), sport animals, and companion animals (e.g., pets or support animals). A subject can be a healthy individual, an individual that has or is suspected of having a disease or pathology or a predisposition to the disease or pathology, or an individual that is in need of therapy or suspected of needing therapy. The terms “individual” or “patient” are intended to be interchangeable with “subject.” A “reference subject” refers to a subject known to have or lack specific properties (e.g., known ocular or other pathology and/or the like).

DETAILED DESCRIPTION

The present disclosure provides a deep learning (DL) framework to classify medical images, such as prostate cancer (PCa) lesions in PSMA PET images in certain embodiments. An important clinical need exists for accurate classification of, for example, sites of uptake in prostate-specific membrane antigen (PSMA) positron emission tomography (PET) images. In some embodiments, the deep learning methods disclosed herein classify PSMA-targeted PET scans and individual lesions into categorizations reflecting the likelihood of PCa. Exemplary applications of these methods include the differentiation of PCa from other lesions that can have uptake as well as PET-based radiation-therapy planning, among numerous other applications. These and other aspects will be apparent upon a complete review of the present disclosure, including the accompanying example and figures.

To illustrate, FIG. 1 is a flow chart that schematically depicts exemplary method steps of classifying a lesion in a medical image of a subject. As shown, method 100 includes extracting one or more image features from at least one region-of-interest (ROI) that comprises the lesion in at least one slice of a positron emission tomography (PET) and/or computed tomography (CT) image of at least a portion of the subject using a convolutional neural network (CNN) to generate CNN-extracted image feature data (step 102). Method 100 also includes extracting one or more radiomic features from the PET and/or CT image to generate radiomic feature data (step 104) and combining the CNN-extracted image feature data and the radiomic feature data with anatomical location information about the lesion to generate combined information (step 106). In addition, method 100 also includes inputting the combined information into an artificial neural network (ANN) that classifies the lesion in the PET and/or CT image using the combined information to generate a classification (step 108).

Figure 2:
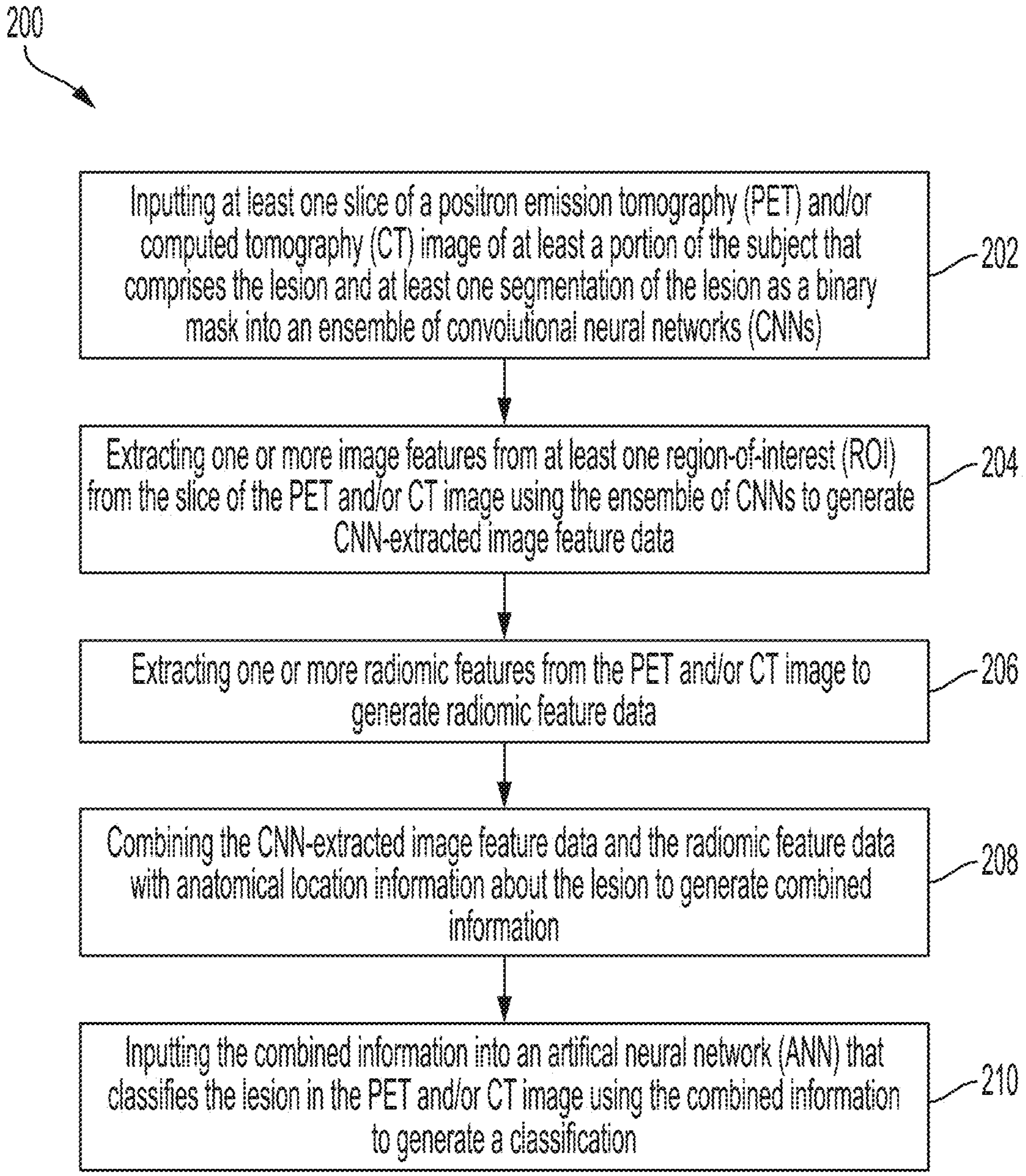
FIG. 2 is a flow chart that schematically depicts exemplary method steps according to some aspects disclosed herein.

To further illustrate, FIG. 2 is a flow chart that schematically depicts some exemplary method steps of classifying a lesion in a medical image of a subject. As shown, method 200 includes inputting at least one slice of a positron emission tomography (PET) and/or computed tomography (CT) image of at least a portion of the subject that comprises the lesion and at least one segmentation of the lesion as a binary mask into an ensemble of convolutional neural networks (CNNs) (step 202). Method 200 also includes extracting one or more image features from at least one region-of-interest (ROI) from the slice of the PET and/or CT image using the ensemble of CNNs to generate CNN-extracted image feature data (step 204), and extracting one or more radiomic features from the PET and/or CT image to generate radiomic feature data (step 206). In addition, method 200 also includes combining the CNN-extracted image feature data and the radiomic feature data with anatomical location information about the lesion to generate combined information (step 208), and inputting the combined information into an artificial neural network (ANN) that classifies the lesion in the PET and/or CT image using the combined information to generate a classification (step 210). Method of treating diseases, such as prostate cancer in subjects that utilize the classifications generated by these methods are also provided.

In some embodiments, the PET and/or CT image includes a $^{18}$F-DCFPyL PET and/or CT image. Typically, the subject has, or is suspected of having, prostate cancer or another type of cancer or another disease. In some embodiments, the medical image comprises of a prostate of the subject. In some embodiments, the classification comprises outputting a predicted likelihood that the lesion is in a given prostate-specific membrane antigen reporting and data system (PSMA-RADS) class. In some embodiments, multiple predicted likelihoods are generated using an ensemble of CNNs and those predicted likelihoods are averaged to generate the classification. In some embodiments, the classification comprises a confidence score.

In some embodiments, the ROI is cropped substantially around the lesion. In some embodiments, the ROI comprises a delineated lesion ROI and/or a circular ROI. In some embodiments, the radiomic features are extracted from the ROI. In some embodiments, the slice comprises a full field-of-view (FOV). In some embodiments of the methods, the slice is an axial slice. In some embodiments, the ANN is fully-connected.

In some embodiments, the anatomical location information comprises a bone, a prostate, a soft tissue, and/or a lymphadenopathy. In some embodiments, the methods include classifying multiple lesions in the subject. In some embodiments, the methods include performing the classification on a per-slice, a per-lesion, and/or a per-patient basis. In some embodiments, the methods include inputting at least one manual segmentation of the lesion as a binary mask when using the CNN to extract the image features from the ROI. In some embodiments of the methods, the ensemble of CNNs comprises 2, 3, 4, 5, 6, 7, 8, 9, 10, or more submodel s.

EXAMPLES

Example 1: Interpretable Deep Learning and Radiomics Framework for Classification of Prostate Cancer Lesions on PSMA-Targeted Pet Methods PSMA PET/CT Dataset The dataset used in this study consisted of data 267 $^{18}$F-DCFPyL PET/CT scans with 3,794 segmented lesions and structures. Scans were acquired at 60 min post-injection across two different scanner: GE Discovery RX (GE Healthcare, Waukesha, WI, USA) (N=1,023) and Siemens Biograph mCT (Siemens Healthineers, Erlangen, Germany) (N=2,771). PET images acquired from each scanner had comparable spatial resolution and image noise characteristics. Images from each scanner were resampled to have the same voxel size of 4 mm. Lesions were manually segmented by four trained nuclear medicine physicians on a per-slice basis in the axial view. Each segmented lesion was assigned to one of 9 possible PSMA-RADS categories (Table 1). The PET and CT images were both utilized by the physicians during the segmentation and classification of lesions. The observed PSMA-RADS categories were used as ground truth for the classification task. Specific anatomic locations of each lesion were recorded.

TABLE 1

| PSMA-RADS Classification | Description |
|---|---|
| PSMA-RADS-1A | Benign lesions without uptake |
| PSMA-RADS-1B | Benign lesions with uptake |
| PSMA-RADS-2 | Low uptake in bone or soft tissue sites atypical for PCa |
| PSMA-RADS-3A | Equivocal uptake in soft tissue lesions typical for PCa |
| PSMA-RADS-3B | Equivocal uptake in bone lesions not clearly benign |
| PSMA-RADS-3C | Lesions atypical for PCa but have high uptake |
| PSMA-RADS-3D | Lesions concerning for PCa but lack uptake |

TABLE 1-continued

| PSMA-RADS Classification | Description |
|---|---|
| PSMA-RADS-4 | Lesions with high uptake typical for PCa but lack anatomic abnormality |
| PSMA-RADS-5 | Lesions with high uptake and anatomic findings indicative of PCa |

Each patient had an approximate average of 14 segmentations. The data were randomly partitioned into a training set, a lesion-level validation set, and a patient-level test set. Data from 53 randomly selected patients were set aside in the separate patient-level test set. The remaining data were randomly split on a lesion level into training and validation sets. This was done to evaluate the performance of the framework on the lesion-level and patient-level PSMA-RADS classification tasks in the context of both in- and out-of-patient-distribution data samples present in the validation and test sets, respectively. The training, validation, and test sets had 2,302, 760, and 732 lesions, respectively, with a 60%/20%/20% split. All slices belonging to the same lesion were partitioned into the same dataset such that there was no overlap on a per-lesion basis between the training, validation, or test datasets.

DL and Radiomics Framework

Figure 3A:
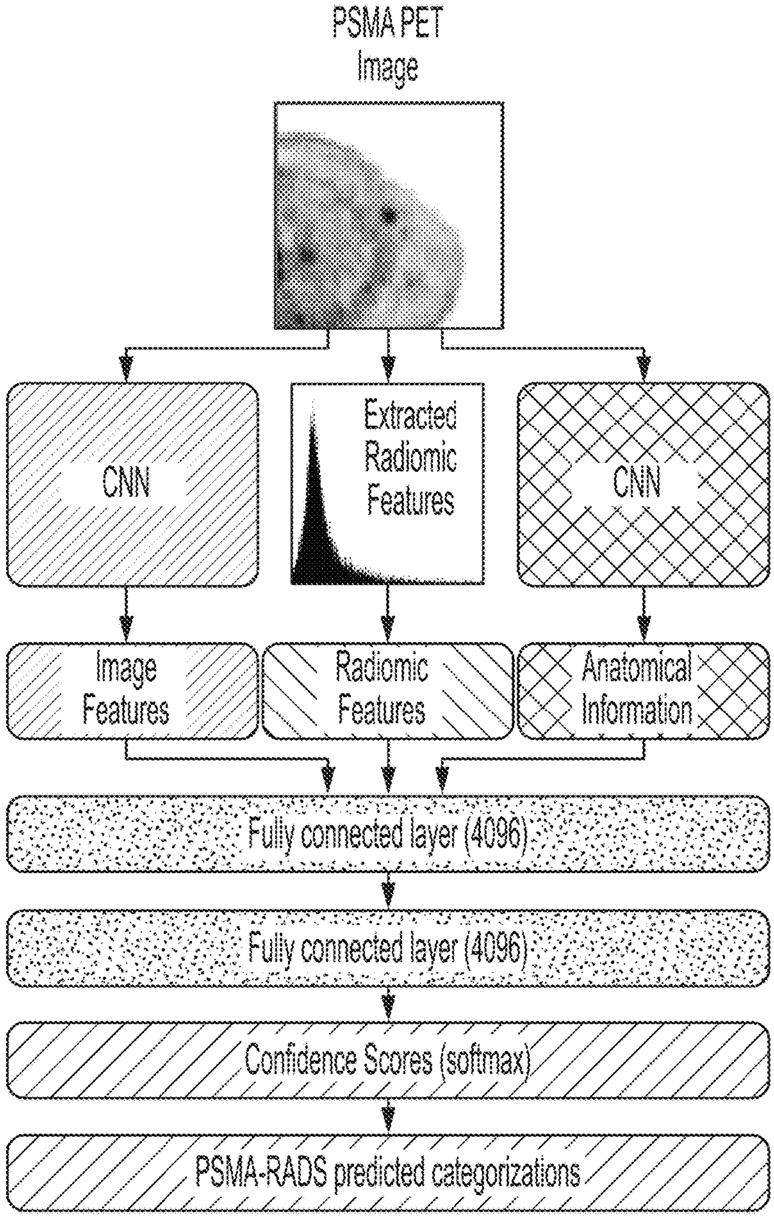
FIG. 3 (panels a and b) schematically show a deep learning and radiomics framework (a) and the detailed CNN architecture (b). Values in parenthesis refer to the number of feature maps and hidden neurons.

A framework using DL and radiomics was developed for classifying lesions on PSMA PET images into the appropriate PSMA-RADS categories. A cropped PET image slice containing a lesion, radiomic features, and anatomical information extracted from that lesion were used as inputs (FIG. 3). A deep convolutional neural network (CNN) extracted lesion features directly from the cropped PET image slice. The CNN implicitly extracted textural information and local contextual features in early layers of the network as well as global information in later layers relevant for the classification task. Radiomic features were extracted from a region of interest (ROI) around the lesion to explicitly capture clinically relevant features that might be missed by the CNN. Both the CNN-extracted and radiomic features were combined with the tissue type information and passed into a PSMA-RADS classifier. The framework was trained on cropped image slices to augment the number of training data samples and to preserve the per-slice nature of the manually segmented ROIs used for radiomic feature extraction.

CNN Architecture and Image Feature Extraction

Figure 3B:
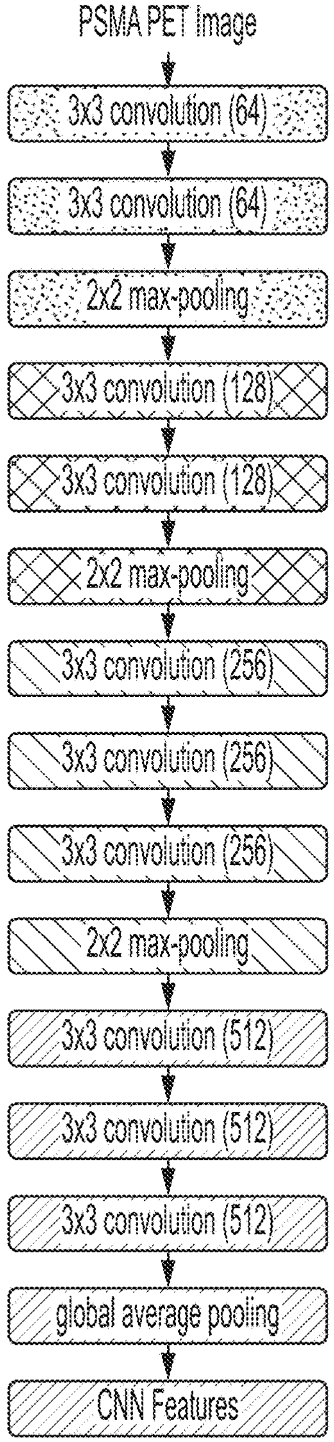

The CNN architecture is shown in FIG. 3*b*. A rectified linear unit (ReLU) activation function was applied after each convolutional layer. Spatial dropout and batch normalization were applied after all convolutional layers during training to regularize the network and prevent co-adaptation between hidden neurons. Dropout probabilities of 0.1 and 0.25 were applied to the first and last two convolutional layer blocks, respectively (Goodfellow I, Bengio Y and Courville A 2016 Deep learning (MIT press)).

The input PET images were cropped with the lesion at the center of the ROI. This was done to classify a single lesion while avoiding confusion with other nearby lesions. The PET images containing a lesion were processed on a 2D per-slice basis in the axial view. A bounding box region of interest (ROI) with a diagonal length 7.5 times the lesion diameter was used to define the size of the cropped PET image (FIG. 4). The cropped images were then resampled with nearest neighbor's interpolation to have an image size of 64×64. While resampling the cropped image changes the relative lesion size, information about the lesion volume, measured in cubic centimeters (cc), was included in the radiomic feature set.

Figure 4A:
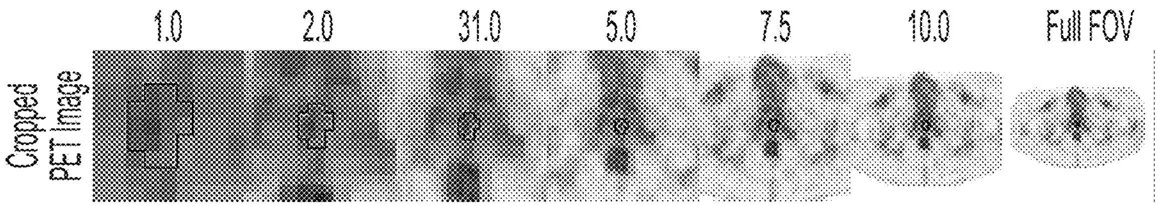
FIG. 4 (panels a-d) shows optimization of lesion crop size (a and c) and circular ROI size for extracting radiomic features (b and d).

The optimal size of the bounding box around the lesion was found by training the network only on cropped images of varying sizes. Bounding boxes with diagonal lengths scaled by the lesion diameter by a factor of 1.0, 2.0, 3.0, 5.0, 7.5, 10.0 were investigated (FIG. 4*a*). The image containing the full field-of-view (FOV) was also investigated. The bounding box size with the best performance on the validation set was selected.

Radiomic Feature Extraction

Figure 4B:
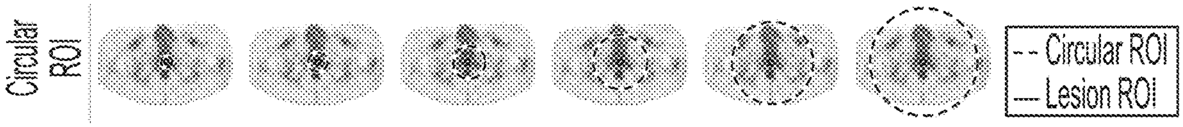

Radiomic features were extracted from the ROIs around the lesions on a per-slice basis to directly capture lesion intensity and morphology characteristics. Intensity characteristics included the mean and variance of lesion intensity, mean and variance of lesion background intensity, lesion-to-background ratio, and the maximum standardized uptake value (SUV) within the lesion. Morphological features included lesion volume, circularity, solidity and eccentricity measures. The manual segmentations were used to define lesion pixels. A circular ROI was defined around the lesion to capture the background pixels (FIG. 4*b*).

The optimal diameter of the circular ROI was also investigated. Diameters scaled by the lesion diameter by a factor of 1.0, 2.0, 3.0, 5.0, 7.5 and 10.0 were used to extract radiomic features on the training and validation sets (FIG. 4*b*). The network was trained only on the input radiomic features from the training set. The diameter with the best performance on the validation set was selected.

Anatomical Tissue-Type CNN Classifier

Since the PSMA-RADS categorization scheme incorporates information about the tissue type at the site of uptake (e.g., uptake in soft tissue vs. bone lesions) (Table 1), the tissue type information was also included as an input to the framework. Tissue types at the anatomic locations for each lesion were categorized into one of 4 broad categories, including bone, prostate, soft tissue, and lymphadenopathy, and were converted into one-hot-vector encodings. A separate CNN was trained on the training set to automatically classify the tissue type of a lesion using only the PET image as input.

The tissue-type CNN classifier architecture is shown in FIG. 3*b*. The CNN received only the cropped PET image containing the lesion as input and output the predicted tissue type of the lesion. The tissue-type CNN classifier was trained on the training set separately from the rest of the framework on the tissue type classification task. The tissue-type CNN was trained on a per-slice basis by optimizing a class-weighted categorical cross-entropy loss function with an adaptive stochastic gradient descent-based optimization algorithm, Adam, using a batch size of 512 samples for 500 epochs. Evaluation metrics including overall accuracy, precision, recall, F1 score, receiver operating characteristic (ROC) curve, and area under ROC curve (AUROC) were assessed on the validation and test sets.

Feature Combination and Classification

The CNN-extracted features, the radiomic features, and the tissue type information were input into a fully connected network (FIG. 3). A ReLU activation, element-wise dropout with a dropout probability of 0.5, and batch normalization were applied after each fully connected layer. The final softmax activation layer yielded softmax probabilities indicating the likelihood of belonging to one of the 9 PSMA-RADS categories. The relative importance of each input, including the cropped PET image, the extracted radiomic features, and the tissue type of the lesion, was investigated by evaluating the performance of the framework when given different input combinations (Table 2).

TABLE 2

| Input Features | Description of Feature Combinations |
|---|---|
| IFL | PET Image, radiomic features, tissue type at the anatomic location of the lesion |
| IL | PET Image, tissue type at the anatomic location of the lesion |
| FL | Radiomic features, tissue type at the anatomic location of the lesion |
| IF | PET Image, radiomic features |
| I | PET Image |
| F | Radiomic features |

Hyperparameter Optimization and Training

The framework was trained on a per-slice basis on the training set by minimizing a class-weighted categorical cross-entropy loss function that quantified the error between the predicted and observed PSMA-RADS categories. The framework was optimized via a stochastic gradient-based optimization algorithm based on adaptive moment estimation (Adam). Hyperparameters, including batch size and the number of training epochs, were optimized via a grid search. The framework was trained with a batch size of 512 samples for 500 epochs on the training set with early stopping to prevent overfitting.

The hyperparameters of the framework, including batch size and the number of training epochs, were optimized via a grid search. The hyperparameter sweep for batch size was performed for batch sizes of 32, 64, 128, 256, and 512 samples. The hyperparameter sweep for the number of training epochs was performed for 200, 300, 400, 500, and 1000 epochs. The final network architecture was trained with a batch size of 512 samples for 500 epochs on the training set.

Lesion-Level Prediction

The framework yielded predictions on both a per-slice and per-lesion basis. Predictions on a per-slice basis were performed by taking the PSMA-RADS category with the highest softmax probability as the predicted class. Lesion-level predictions were performed by taking a majority vote across all slices belonging to the same lesion. A soft majority voting scheme was used where the predicted softmax probabilities for each class were averaged across all slices for that lesion. The lesion was classified as belonging to the PSMA-RADS category with the highest average softmax probability. While we also experimented with a hard majority voting scheme where the lesion was classified as belonging to the category with the highest number of votes across all slices of that lesion, soft majority voting generally had the best performance.

The lesion-level performance of the trained framework was evaluated on both the validation and test sets. Evaluation metrics including overall accuracy, precision, recall, F1 score, receiver operating characteristic (ROC) curve, and area under ROC curve (AUROC) were assessed. Accuracy metrics, confusion matrices, and ROC curves were reported on a per-class basis and across all PSMA-RADS categories. Accuracy metrics were weighted by the ratio of true instances for each class to account for class imbalances when evaluating across all categories.

Lesion-level performance was evaluated in two cases. First, the tissue types manually annotated by a physician were used as inputs to evaluate the framework's performance in the context of using correct tissue type information. Second, the CNN-predicted tissue types were used as inputs to evaluate the framework's performance in the context of using the automatically classified tissue types. Since the data were acquired from two different scanners, the lesion-level performance was also compared across different scanners.

Patient-Level Prediction

The patient-level prediction was also performed on the overall PSMA PET scan. Individual lesions were first classified by the framework and assigned to a PSMA-RADS category using soft majority voting. The highest PSMA-RADS score across all lesions present on the PSMA PET scan was taken as the overall PSMA-RADS category for that patient. The performance of the trained framework for patient-level predictions was evaluated on the test set with the evaluation metrics described above. The patient-level performance was evaluated using both the manually annotated tissue types and the CNN-predicted tissue types as inputs. The patient-level performance was also compared across scans from different scanners.

Visualization of t-SNE Prediction Space

The framework's predictions were visualized using t-SNE to provide an understanding of how the framework clusters its predictions in relation to the PSMA-RADS categories. t-SNE is an unsupervised dimensionality reduction technique used for visualizing high-dimensional data and excels in revealing the local structure of the data while also preserving its global geometry. The framework's predictions on the training and test sets were mapped to two dimensions via t-SNE with principal components analysis initialization and visualized in scatter plots.

A Confidence Score for PSMA-RADS Classification

The framework provided a confidence score for each prediction that reflected the expected level of accuracy. To obtain well-calibrated confidence measures, temperature scaling model calibration was performed after training. Temperature scaling, a single-parameter variant of Platt scaling, is an effective method for calibrating DNNs. A scalar parameter referred to as temperature, T, scaled the framework outputs before the softmax activation to yield calibrated confidence scores. Hyperparameter optimization was performed on the validation set to determine the optimal temperature. Temperature scaling was applied to the framework's predictions on the test set. Confidence histograms were observed before and after performing temperature scaling calibration to compare the test set accuracy with the framework's average confidence. Confidence scores of accurate and inaccurate predictions were compared. Confidence scores on the training and test sets were visualized on t-SNE scatter plots.

Feature Importance

The relative importance of the inputs for the classification task was evaluated by using different combinations of the inputs, including the cropped PET image (I), extracted radiomic features (F), and tissue type of the lesion (L), to train the framework (Table 2). For each input feature combination, the framework was trained with the training set and evaluated on the validation set. Performance was evaluated on a per-slice and lesion-level basis using the evaluation metrics as described above. Measures of precision, recall, F1 score, and ROC curves were weighted by the ratio of true instances for each class to account for class imbalances. Here, the manually annotated tissue types were used as inputs to evaluate the relative feature importance.

Statistical Analysis and Implementation

Statistical significance was determined using a two-tailed t-test where a $P<0.05$ was used to infer a statistically significant difference. 95% confidence intervals (CI) of accuracy metrics were reported. Statistical analysis, radiomic feature extraction, and data preprocessing steps were implemented in Python 3.8.8 and MATLAB 2019b. The framework architecture and training were implemented in Python 3.8.8, TensorFlow 2.4.1, and Keras 2.4.3. Experiments were run on an NVIDIA Quadro P5000 GPU and a Linux CentOS 7.6 operating system.

Results

Characterizing the PSMA PET Data

Figure 5:
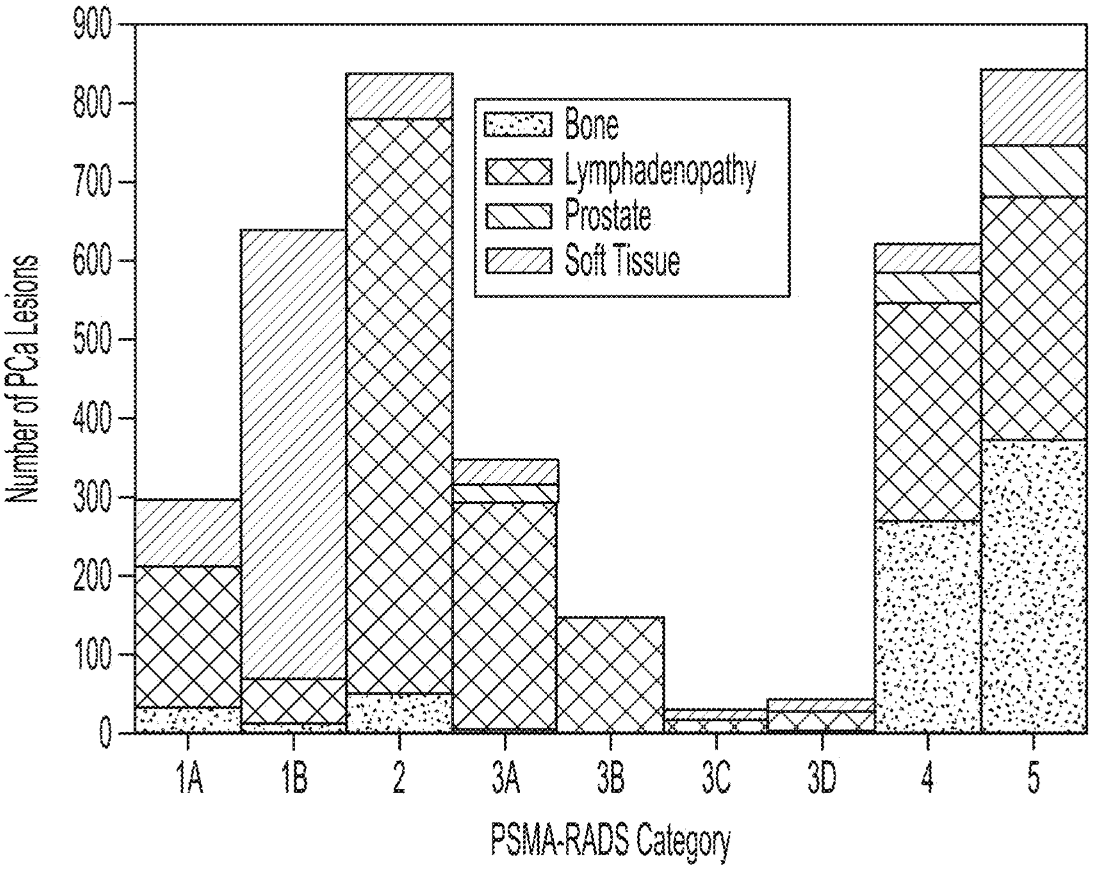
FIG. 5 is a histogram of PSMA-RADS categories of the classified prostate cancer lesions in $^{18}$F-DCFPyl PSMA PET images and the recorded tissue type information at the anatomical locations of the lesions.

A histogram of the PSMA-RADS categories and tissue type distribution across all lesions is shown in FIG. 5. PSMA-RADS-1A, -1B, -2, -3A, -3B, -3C, -3D, -4, and -5 categories had 294, 637, 835, 345, 147, 31, 43, 619, and 843 lesions, respectively. There were 898, 1,873, 127, and 896 lesions with a tissue type of bone, lymphadenopathy, prostate, and soft tissue, respectively.

Optimizing the Bounding Box and Circular ROIs Around the Lesion

Figure 4C:
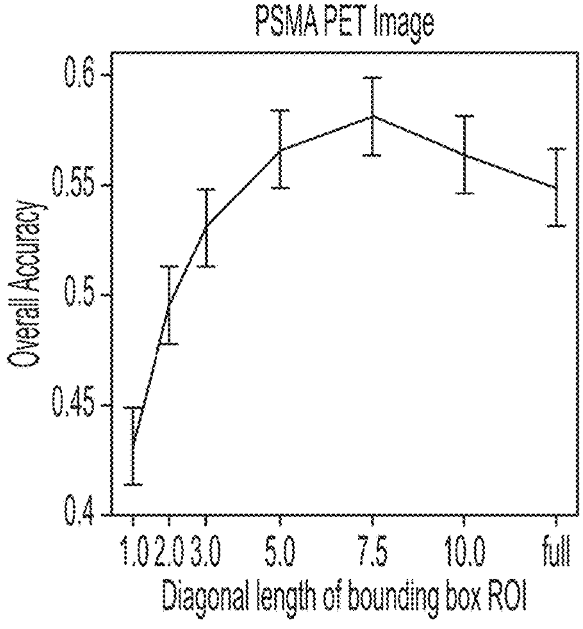
Figure 4D:
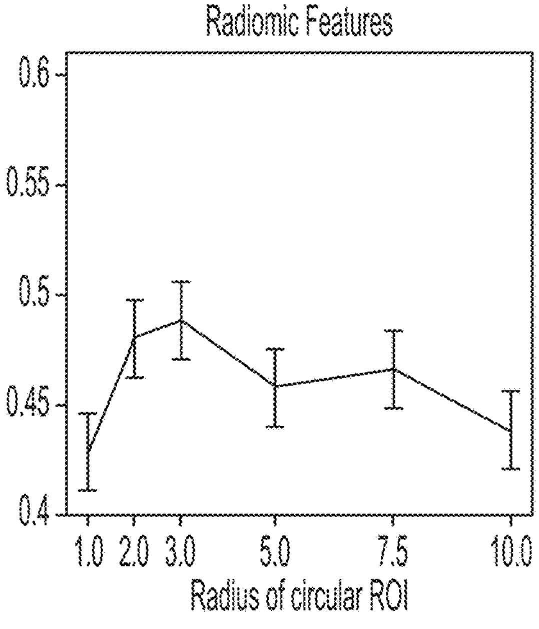

The crop size defined by the bounding box with a diagonal length 7.5 times the lesion diameter yielded the highest overall accuracy on the validation set (FIG. 4*c*). The optimal bounding box size also significantly outperformed the networks trained on cropped images with bounding boxes using a diagonal length of 1.0, 2.0, 3.0, and a full FOV (P<0.05). The circular ROI with a diameter 3.0 times the lesion diameter yielded the highest overall accuracy (FIG. 4*d*) on the validation set. The optimal circular ROI significantly outperformed the networks trained using circular ROIs with diameters 1.0, 5.0, 7.5, and 10.0 times the lesion diameter (P<0.05).

Evaluating the Tissue-Type CNN Classifier

Figure 6A:
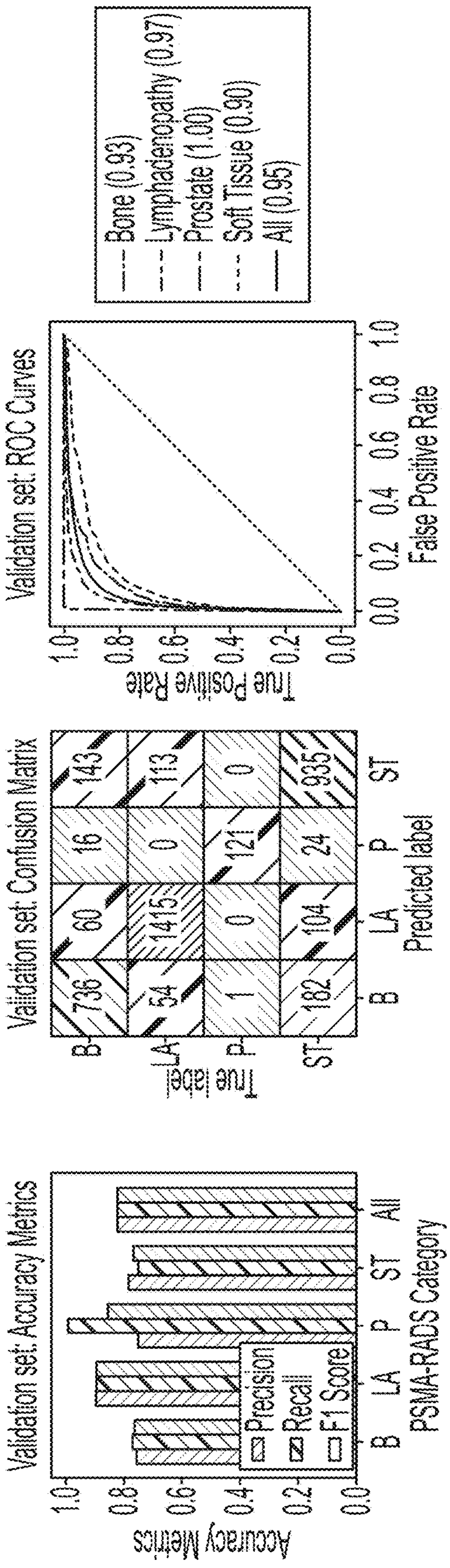
FIG. 6 (panels a and b) shows the performance of the tissue-type CNN performance on the validation (a) and test sets (b). B: bone, LA: lymphadenopathy, P: prostate, and ST: soft tissue.
Figure 6B:
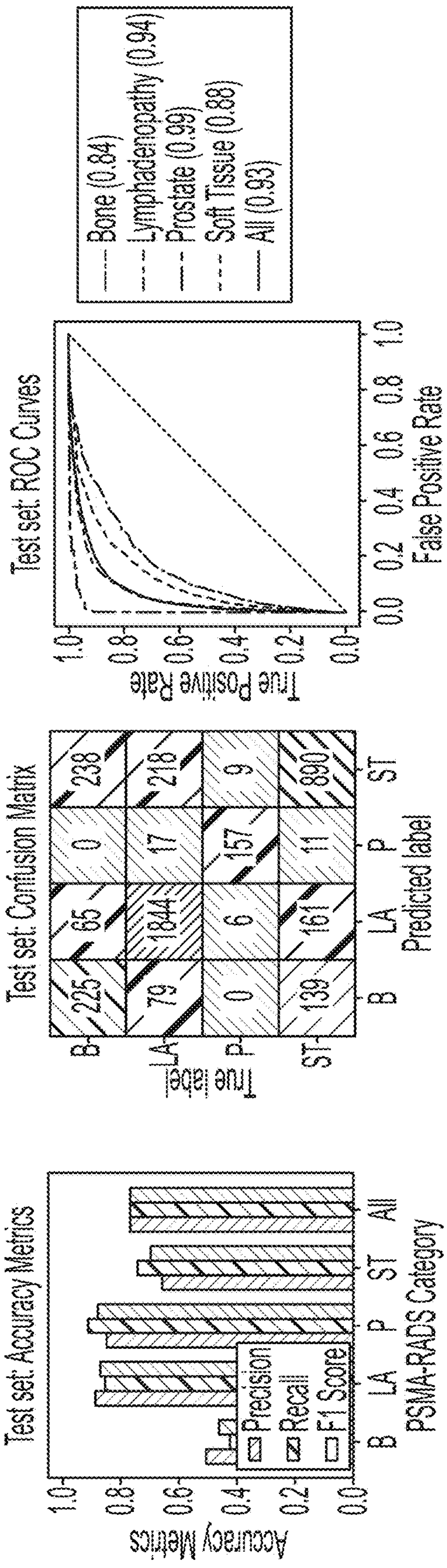

The tissue-type CNN classifier yielded an overall accuracy of 0.82 (95% CI: 0.81, 0.83) and 0.77 (95% CI: 0.75, 0.78) and an AUROC value of 0.95 and 0.93 on the validation and test sets, respectively, indicating accurate tissue type classification. Evaluation metrics and ROC curves are shown in FIG. 6 and Table 3. The CNN had high performance in classifying the tissue type of lesions from the prostate and lymphadenopathy regions and achieved AUROC values of 0.99 and 0.94, respectively, for those lesions on the test set (FIG. 6). The tissue-type CNN classifier had relatively consistent performance across lesions in the validation and test sets, with the exception of lesions in the bone region on the test set (FIG. 6*b*). Further incorporating CT imaging as an input to the CNN may help to improve the tissue type classification for those lesions.

TABLE 3

| Tissue Type | Precision | Recall | F1 Score | AUROC |
|---|---|---|---|---|
| | Validation set | | | |
| Bone | 0.76 | 0.77 | 0.76 | 0.93 |
| Lymphadenopathy | 0.90 | 0.89 | 0.90 | 0.97 |
| Prostate | 0.75 | 0.99 | 0.86 | 1.00 |
| Soft Tissue | 0.79 | 0.75 | 0.77 | 0.90 |
| All Classes | 0.82 | 0.82 | 0.82 | 0.95 |
| | Test set | | | |
| Bone | 0.51 | 0.42 | 0.46 | 0.84 |
| Lymphadenopathy | 0.89 | 0.85 | 0.87 | 0.94 |
| Prostate | 0.85 | 0.91 | 0.88 | 0.99 |
| Soft Tissue | 0.66 | 0.74 | 0.70 | 0.88 |
| All Classes | 0.77 | 0.77 | 0.77 | 0.93 |

Evaluating Feature Importance

Figure 7A:
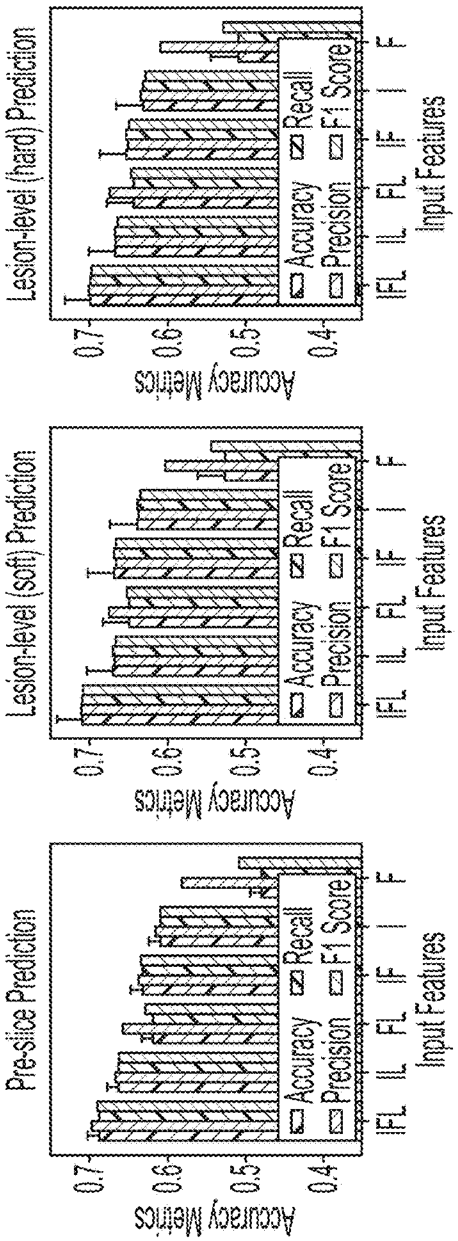
FIG. 7 (panels a and b) shows the accuracy metrics (a) and receiver operating characteristic (ROC) curves (b) for different input feature combinations.
Figure 7B:
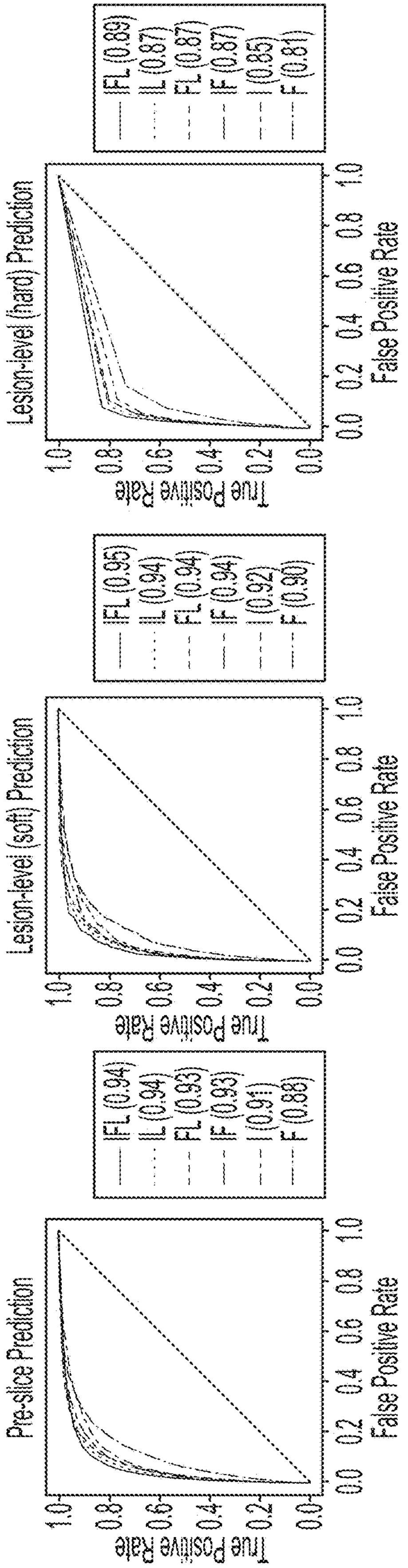

The network trained on all input features (IFL) had the highest performance across all evaluation metrics and significantly outperformed the networks trained on all other feature combinations (IL, FL, IF, I, and F; P<0.05) on the basis of overall accuracy for per-slice and lesion-level (both soft and hard majority vote) prediction (FIG. 7 and Table 4). Evaluation on a lesion-level basis with a soft majority voting scheme had the highest performance across all accuracy metrics when training with all inputs (Table 4).

The network trained only with the PET image (I) significantly outperformed the networks trained on only radiomic features (F) on the basis of overall accuracy (P<0.05) for all modes of prediction. However, the network trained with both the image and radiomic features (IF) significantly outperformed the networks trained only on either the image (I) or radiomic features (F) on the basis of overall accuracy (P<0.05) for per-slice evaluation. This highlights the importance of combining both CNN-extracted and radiomic lesion features for the classification task. The networks trained on IL and FL significantly outperformed the networks trained only on the image (I) and radiomic features (F), respectively, on the basis of overall accuracy (P<0.05) for per-slice and lesion-level (hard majority vote) prediction, highlighting the importance of the tissue type information.

TABLE 4

| Input features | Accuracy | Precision | Recall | F1 Score | AUROC |
|---|---|---|---|---|---|
| | Per-slice performance | | | | |
| IFL | 0.69 (0.67, 0.70) | 0.70 | 0.69 | 0.69 | 0.94 |
| IL | 0.66 (0.65, 0.68) | 0.67 | 0.66 | 0.66 | 0.94 |
| FL | 0.62 (0.60, 0.63) | 0.66 | 0.62 | 0.63 | 0.93 |
| IF | 0.63 (0.62, 0.65) | 0.64 | 0.63 | 0.63 | 0.93 |
| I | 0.61 (0.59, 0.63) | 0.62 | 0.61 | 0.61 | 0.91 |
| F | 0.48 (0.46, 0.49) | 0.58 | 0.48 | 0.51 | 0.88 |
| | Lesion-level (soft majority vote) performance | | | | |
| IFL | 0.71 (0.68, 0.74) | 0.71 | 0.71 | 0.71 | 0.95 |
| IL | 0.67 (0.64, 0.70) | 0.67 | 0.67 | 0.67 | 0.94 |
| FL | 0.65 (0.61, 0.68) | 0.67 | 0.65 | 0.65 | 0.94 |
| IF | 0.67 (0.63, 0.70) | 0.67 | 0.67 | 0.67 | 0.94 |
| I | 0.64 (0.61, 0.67) | 0.64 | 0.64 | 0.64 | 0.92 |
| F | 0.53 (0.49, 0.56) | 0.60 | 0.53 | 0.54 | 0.90 |
| | Lesion-level (hard majority vote) performance | | | | |
| IFL | 0.70 (0.67, 0.73) | 0.70 | 0.70 | 0.70 | 0.89 |
| IL | 0.67 (0.63, 0.70) | 0.67 | 0.67 | 0.66 | 0.87 |
| FL | 0.64 (0.61, 0.68) | 0.67 | 0.64 | 0.65 | 0.87 |
| IF | 0.65 (0.62, 0.69) | 0.65 | 0.65 | 0.65 | 0.87 |
| I | 0.63 (0.60, 0.67) | 0.63 | 0.63 | 0.63 | 0.85 |
| F | 0.51 (0.47, 0.54) | 0.61 | 0.51 | 0.53 | 0.81 |

Values in parenthesis correspond to 95% confidence intervals.

Per-Slice Performance

Figure 8A:
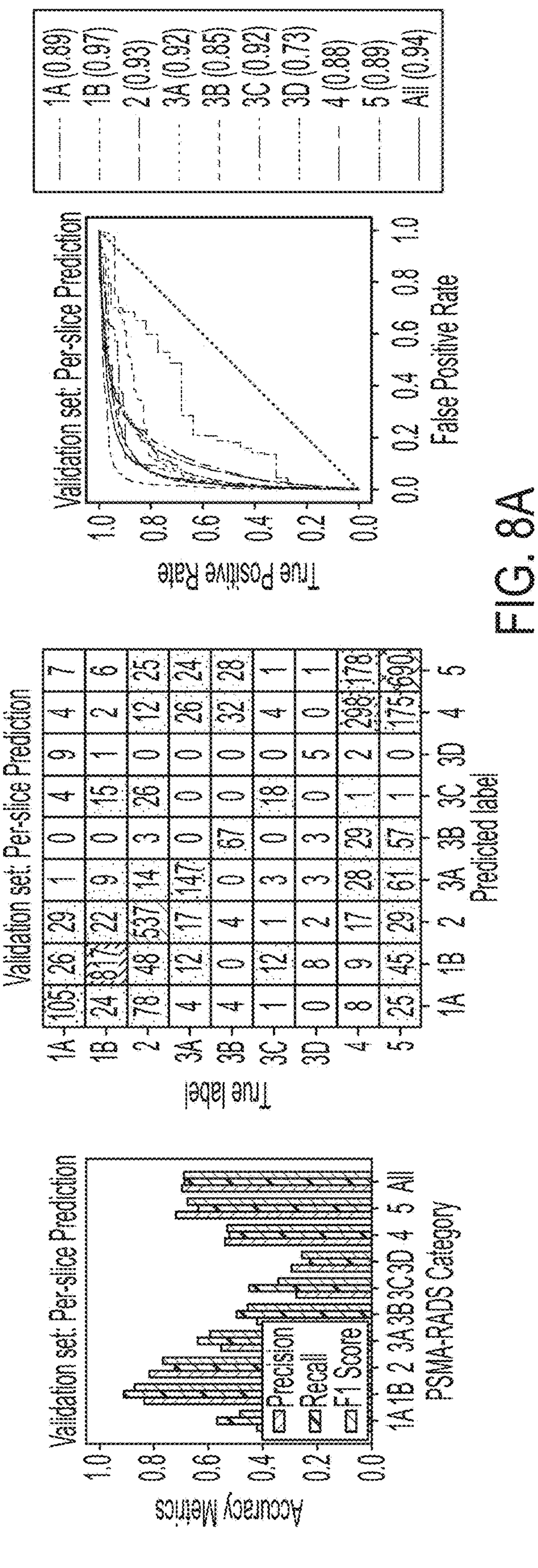
FIG. 8 (panels a and b) shows the per-slice performance on the validation (a) and test (b) sets. Accuracy metrics (left), confusion matrices (middle), and ROC curves (right).
Figure 8B:
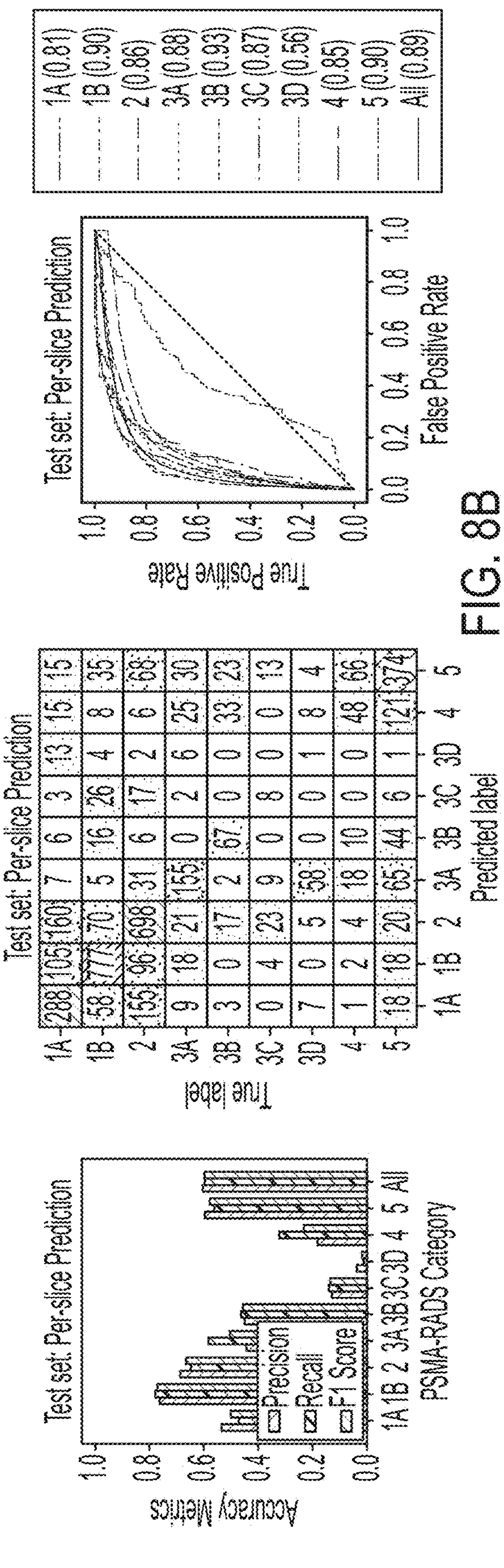

Accuracy metrics, confusion matrices, and ROC curves on the per-slice performance of the framework on the validation and test sets were reported in FIG. 8 and Table 5. The framework yielded an overall accuracy of 0.69 (95% CI: 0.67, 0.70) and an AUROC value of 0.94 on the validation set across all PSMA-RADS categories for per-slice prediction. The framework yielded an overall accuracy of 0.60 (95% CI: 0.58, 0.61) and an AUROC value of 0.89 on the test set for per-slice prediction.

TABLE 5

| PSMA-RADS Category | Precision | Recall | F1 Score | AUROC |
|---|---|---|---|---|
| | Validation set: Per-slice performance | | | |
| 1A | 0.42 | 0.57 | 0.48 | 0.89 |
| 1B | 0.84 | 0.91 | 0.87 | 0.97 |

TABLE 5-continued

| PSMA-RADS Category | Precision | Recall | F1 Score | AUROC |
|---|---|---|---|---|
| 2 | 0.82 | 0.72 | 0.77 | 0.93 |
| 3A | 0.55 | 0.64 | 0.59 | 0.92 |
| 3B | 0.42 | 0.50 | 0.46 | 0.85 |
| 3C | 0.28 | 0.45 | 0.34 | 0.92 |
| 3D | 0.29 | 0.23 | 0.26 | 0.73 |
| 4 | 0.54 | 0.52 | 0.53 | 0.88 |
| 5 | 0.72 | 0.64 | 0.68 | 0.89 |
| All Classes | 0.70 | 0.69 | 0.69 | 0.94 |
| | Test set: Per-slice performance | | | |
| 1A | 0.53 | 0.47 | 0.50 | 0.81 |
| 1B | 0.76 | 0.78 | 0.77 | 0.90 |
| 2 | 0.69 | 0.65 | 0.67 | 0.86 |
| 3A | 0.44 | 0.58 | 0.50 | 0.88 |
| 3B | 0.45 | 0.46 | 0.46 | 0.93 |
| 3C | 0.13 | 0.14 | 0.13 | 0.87 |
| 3D | 0.04 | 0.01 | 0.02 | 0.56 |
| 4 | 0.18 | 0.32 | 0.23 | 0.85 |
| 5 | 0.60 | 0.56 | 0.58 | 0.90 |
| All Classes | 0.60 | 0.60 | 0.60 | 0.89 |

Lesion-Level Performance with Soft Majority Vote

Figure 9A:
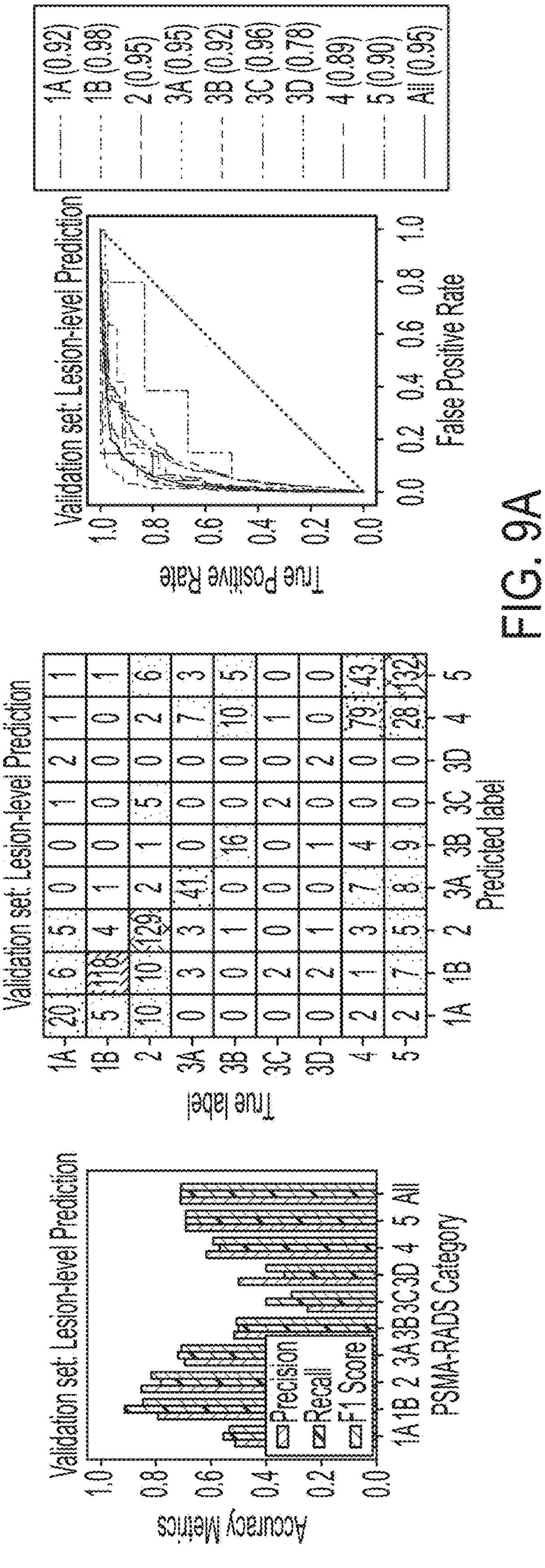
FIG. 9 (panels a and b) shows the lesion-level performance using using soft majority vote on the validation (a) and test (b) sets. Accuracy metrics (left), confusion matrices (middle), and ROC curves (right).
Figure 9B:
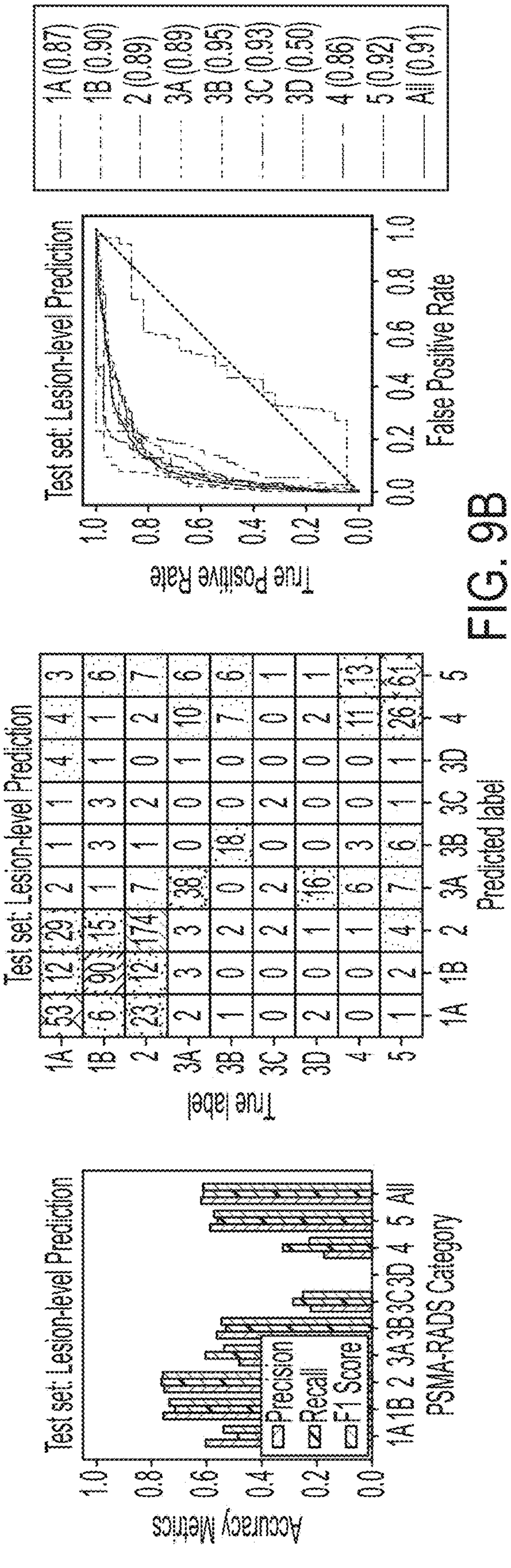

Accuracy metrics, confusion matrices, and ROC curves on the framework's lesion-level performance were reported in FIG. 9 and Table 6. The framework yielded an overall accuracy of 0.71 (95% CI: 0.68, 0.74) and an AUROC value of 0.95 for lesion-level predictions on the validation set (FIG. 9*a*). On the test set, the framework yielded an overall accuracy of 0.61 (95% CI: 0.58, 0.65) and an AUROC value of 0.91 (FIG. 9*b*).

TABLE 6

| PSMA-RADS Category | Precision | Recall | F1 Score | AUROC |
|---|---|---|---|---|
| | Validation set: Lesion-level (soft majority vote) performance | | | |
| 1A | 0.51 | 0.56 | 0.53 | 0.92 |
| 1B | 0.79 | 0.91 | 0.85 | 0.98 |
| 2 | 0.85 | 0.78 | 0.82 | 0.95 |
| 3A | 0.69 | 0.72 | 0.71 | 0.95 |
| 3B | 0.52 | 0.50 | 0.51 | 0.92 |
| 3C | 0.25 | 0.40 | 0.31 | 0.96 |
| 3D | 0.50 | 0.33 | 0.40 | 0.78 |
| 4 | 0.62 | 0.57 | 0.59 | 0.89 |
| 5 | 0.69 | 0.69 | 0.69 | 0.90 |
| All Classes | 0.71 | 0.71 | 0.71 | 0.95 |
| | Test set: Lesion-level (soft majority vote) performance | | | |
| 1A | 0.60 | 0.49 | 0.54 | 0.87 |
| 1B | 0.76 | 0.71 | 0.73 | 0.90 |
| 2 | 0.75 | 0.76 | 0.76 | 0.89 |
| 3A | 0.48 | 0.60 | 0.54 | 0.89 |
| 3B | 0.56 | 0.53 | 0.55 | 0.95 |
| 3C | 0.22 | 0.29 | 0.25 | 0.93 |
| 3D | 0.00 | 0.00 | 0.00 | 0.50 |
| 4 | 0.17 | 0.32 | 0.23 | 0.86 |
| 5 | 0.59 | 0.56 | 0.57 | 0.92 |
| All Classes | 0.62 | 0.61 | 0.61 | 0.91 |

Accuracy metrics for the lesion-level performance of the framework when using the CNN-predicted tissue types as inputs are shown in Table 7. When using the automatically predicted tissue types as inputs, the framework yielded overall accuracies of 0.68 (95% CI: 0.64, 0.71) and 0.55 (95% CI: 0.52, 0.59) and AUROC values of 0.94 and 0.88 on the validation and test sets, respectively. There was no significant difference in the lesion-level performance on the basis of overall accuracy for lesions acquired across different scanners on the validation or test sets (P>0.05).

TABLE 7

| Tissue Type Inputs | Accuracy | Precision | Recall | F1 Score | AUROC |
|---|---|---|---|---|---|
| | Validation set: Lesion-level performance | | | | |
| Manual | 0.71 (0.68, 0.74) | 0.71 | 0.71 | 0.71 | 0.95 |
| Predicted | 0.68 (0.64, 0.71) | 0.67 | 0.68 | 0.67 | 0.94 |
| | Test set: Lesion-level performance | | | | |
| Manual | 0.61 (0.58, 0.65) | 0.62 | 0.61 | 0.61 | 0.91 |
| Predicted | 0.55 (0.52, 0.59) | 0.56 | 0.55 | 0.55 | 0.88 |

Values in parenthesis correspond to 95% confidence intervals. Manual refers to using manually annotated tissue types as inputs. Predicted refers to using CNN-predicted tissue types as inputs.

Lesion-Level Performance with a Hard Majority Vote

Figure 10A:
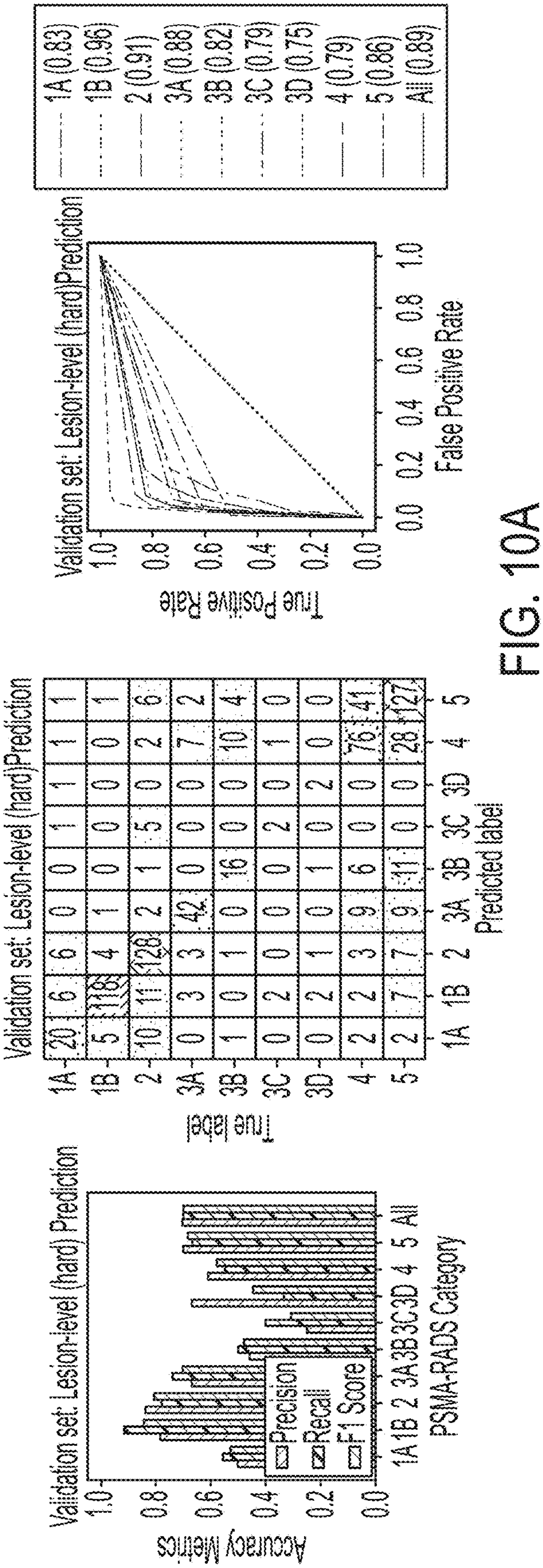
FIG. 10 (panels a and b) shows the lesion-level performance of the framework on the validation (a) and test (b) sets using hard majority-vote. Accuracy metrics (left), confusion matrices (middle), and ROC curves (right).
Figure 10B:
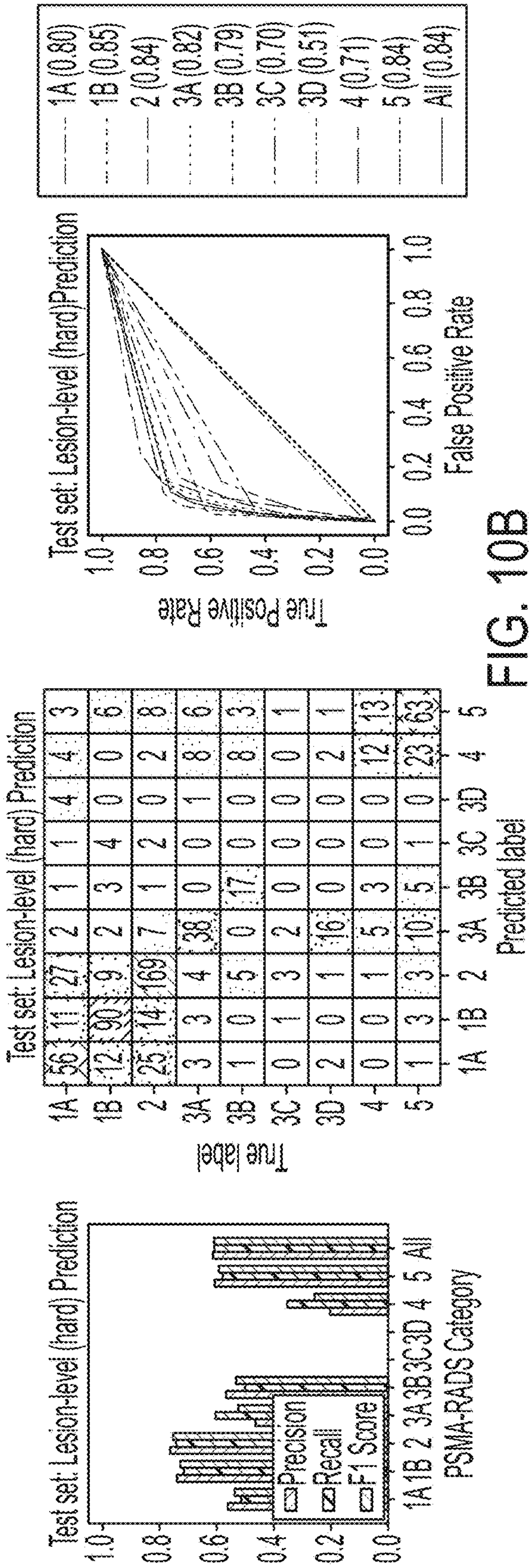

Accuracy metrics, confusion matrices, and ROC curves on the lesion-level predictions using hard majority voting on the validation and test sets were reported in FIG. 10 and Table 8. The framework yielded an overall accuracy of 0.70 (95% CI: 0.67, 0.73) and an AUROC value of 0.89 on the validation set across all PSMA-RADS categories for lesion-level predictions using hard majority voting. The framework yielded an overall accuracy of 0.61 (95% CI: 0.57, 0.64) and an AUROC value of 0.84 on the test set for lesion-level predictions using hard majority voting.

The framework generally had a higher performance with lesion-level prediction using soft majority vote compared to using hard majority voting across all accuracy metrics (Tables 6 and 8). Lesion-level prediction with soft majority voting also had improved performance over per-slice prediction. For example, the framework had the highest F1 score and AUROC value of 0.71 and 0.95, respectively, on the validation set for lesion-level prediction using soft majority vote when compared to per-slice prediction and lesion-level prediction with hard majority voting. In the clinical scenario where a lesion is identified in only one axial slice, the framework can provide lesion classification for that slice. When a lesion is identified in multiple axial slices, the framework may be able to provide lesion-level classification with even higher accuracy.

TABLE 8

| PSMA-RADS Category | Precision | Recall | F1 Score | AUROC |
|---|---|---|---|---|
| | Validation set: Lesion-level (hard majority vote) performance | | | |
| 1A | 0.50 | 0.56 | 0.53 | 0.83 |
| 1B | 0.78 | 0.91 | 0.84 | 0.96 |
| 2 | 0.84 | 0.78 | 0.81 | 0.91 |
| 3A | 0.67 | 0.74 | 0.70 | 0.88 |
| 3B | 0.46 | 0.50 | 0.48 | 0.82 |
| 3C | 0.25 | 0.40 | 0.31 | 0.79 |
| 3D | 0.67 | 0.33 | 0.44 | 0.75 |
| 4 | 0.61 | 0.55 | 0.58 | 0.79 |
| 5 | 0.70 | 0.66 | 0.68 | 0.86 |
| All Classes | 0.70 | 0.70 | 0.70 | 0.89 |
| | Test set: Lesion-level (hard majority vote) performance | | | |
| 1A | 0.56 | 0.51 | 0.54 | 0.80 |
| 1B | 0.74 | 0.71 | 0.73 | 0.85 |
| 2 | 0.76 | 0.74 | 0.75 | 0.84 |
| 3A | 0.46 | 0.60 | 0.52 | 0.82 |
| 3B | 0.57 | 0.50 | 0.53 | 0.79 |
| 3C | 0.00 | 0.00 | 0.00 | 0.70 |

TABLE 8-continued

| PSMA-RADS Category | Precision | Recall | F1 Score | AUROC |
|---|---|---|---|---|
| 3D | 0.00 | 0.00 | 0.00 | 0.51 |
| 4 | 0.20 | 0.35 | 0.26 | 0.71 |
| 5 | 0.61 | 0.58 | 0.59 | 0.84 |
| All Classes | 0.61 | 0.61 | 0.61 | 0.84 |

Patient-Level Performance

Figure 11A:
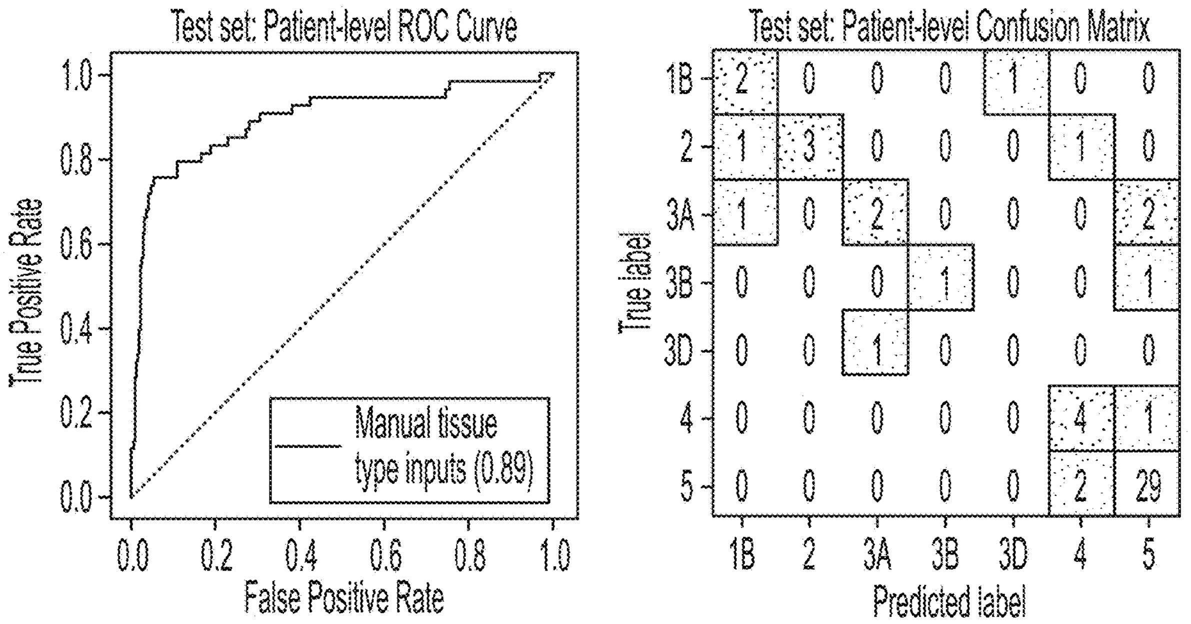
FIG. 11 (panels a and b) shows the patient-level performance on the test set when using the manually annotated tissue types (a) and the CNN-predicted tissue types (b) as inputs. ROC curves (left) and confusion matrices (right).
Figure 11B:
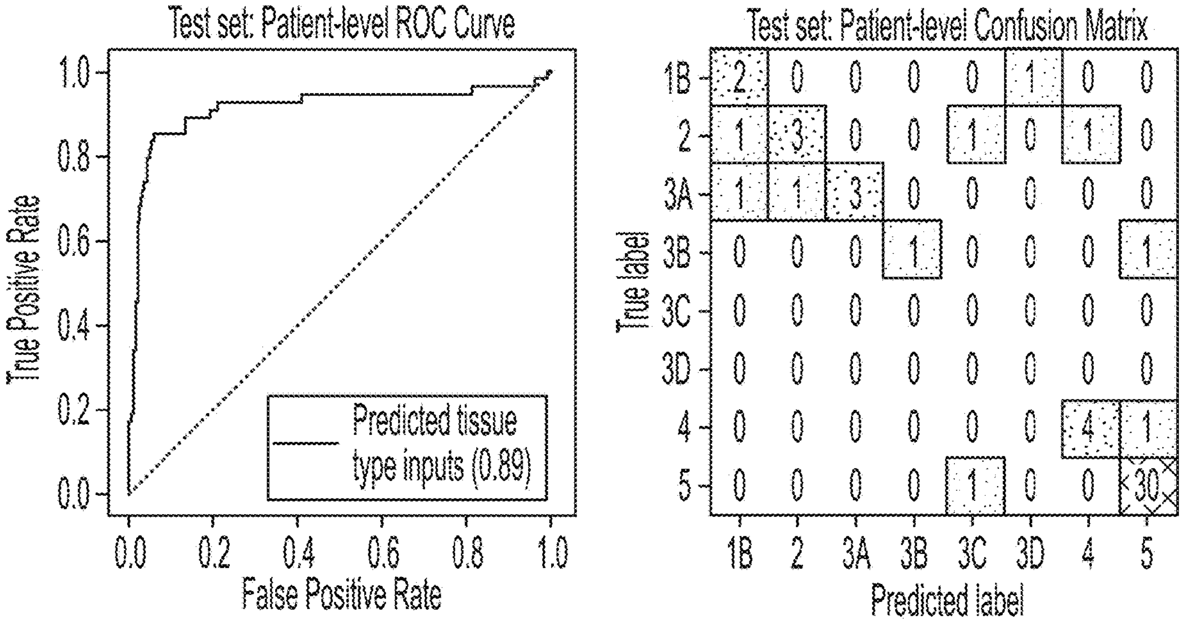

Accuracy metrics, ROC curves, and confusion matrices on the framework's patient-level performance on the test set are shown in Table 9 and FIG. 11. The framework yielded an overall accuracy of 0.77 (95% CI: 0.66, 0.89) and an AUROC value of 0.89 for patient-level prediction when using the manually annotated tissue types as inputs (FIG. 11*a*). When using the CNN-predicted tissue types, the framework yielded an overall accuracy of 0.81 (95% CI: 0.71, 0.92) and an AUROC value of 0.91 for patient-level prediction (FIG. 11*b*). There was no significant difference in the framework's patient-level performance on the basis of overall accuracy for scans acquired across different scanners ($P>0.05$).

TABLE 9

| | Test set: Patient-level performance | | | | |
|---|---|---|---|---|---|
| Tissue Type Inputs | Accuracy | Precision | Recall | F1 Score | AUROC |
| Manual | 0.77 (0.66, 0.89) | 0.79 | 0.77 | 0.76 | 0.89 |
| Predicted | 0.81 (0.71, 0.92) | 0.85 | 0.81 | 0.82 | 0.91 |

Values in parenthesis correspond to 95% confidence intervals. Manual refers to using manually annotated tissue types as inputs. Predicted refers to using CNN-predicted tissue types as inputs.

Patient-Level Performance Using Only Images and Tissue Types (IL) as Inputs

Figure 12A:
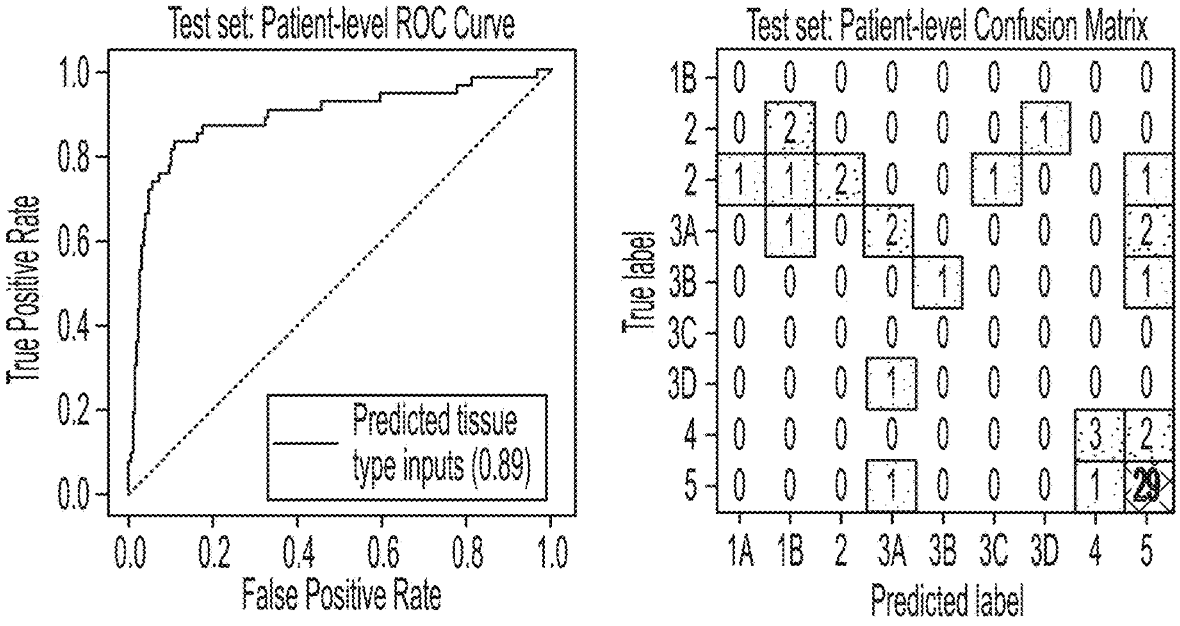
FIG. 12 (panels a and b) shows the patient-level performance of the framework using only images and tissue types as inputs (IL) on the test set. ROC curves (left) and confusion matrices (right) when using the manually annotated tissue types (a) and the CNN-predicted tissue types (b) as inputs.
Figure 12B:
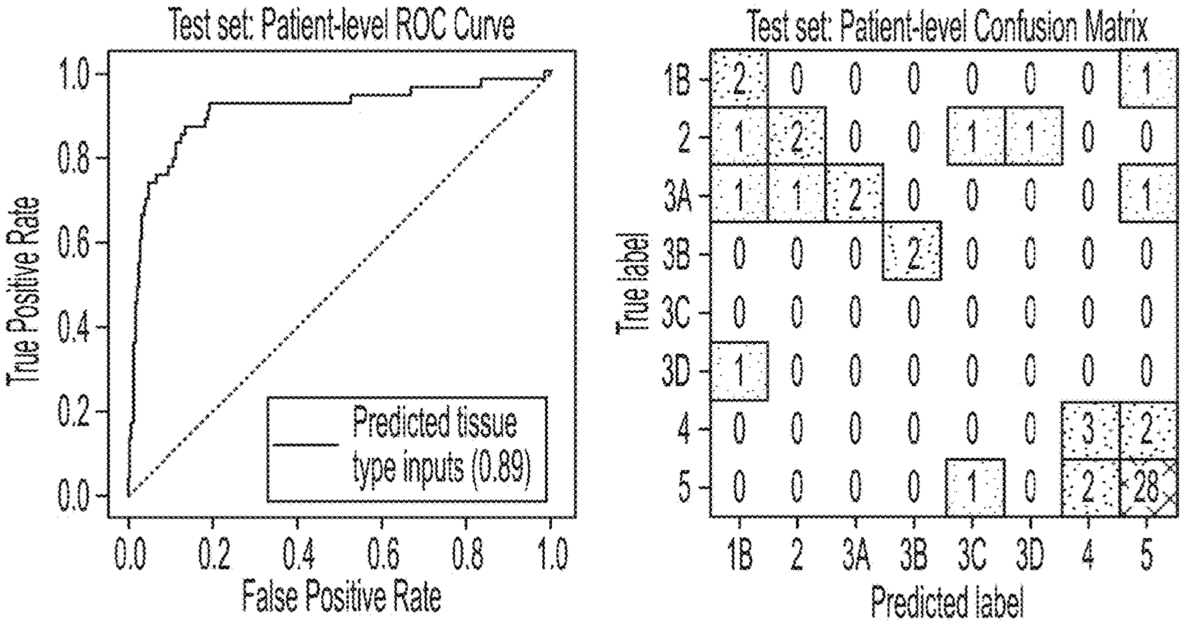

The patient-level performance of the framework on the test set was also evaluated when given only the PET image and tissue type information as inputs to the network. Accuracy metrics, ROC curves, and confusion matrices are shown in Table 10 and FIG. 12. The framework yielded an overall accuracy of 0.74 (95% CI: 0.62, 0.85) and an AUROC value of 0.89 for patient-level prediction, across all PSMA-RADS categories on the test set when using the manually annotated tissue types as inputs (FIG. 12*a*). When using the CNN-predicted tissue types as inputs, the framework yielded an overall accuracy of 0.74 (95% CI: 0.62, 0.85) and an AUROC value of 0.91 for per patient-level prediction on the test set (FIG. 12*b*).

TABLE 10

| | Test set: Patient-level performance | | | | |
|---|---|---|---|---|---|
| Tissue Type Inputs | Accuracy | Precision | Recall | F1 Score | AUROC |
| Manual | 0.74 (0.62, 0.85) | 0.78 | 0.74 | 0.73 | 0.89 |
| Predicted | 0.74 (0.62, 0.85) | 0.79 | 0.74 | 0.74 | 0.91 |

Values in parenthesis correspond to 95% confidence intervals. Manual refers to prediction using manually annotated tissue types.

Analysis of the Framework's Predictions Using t-SNE

Figure 13A:
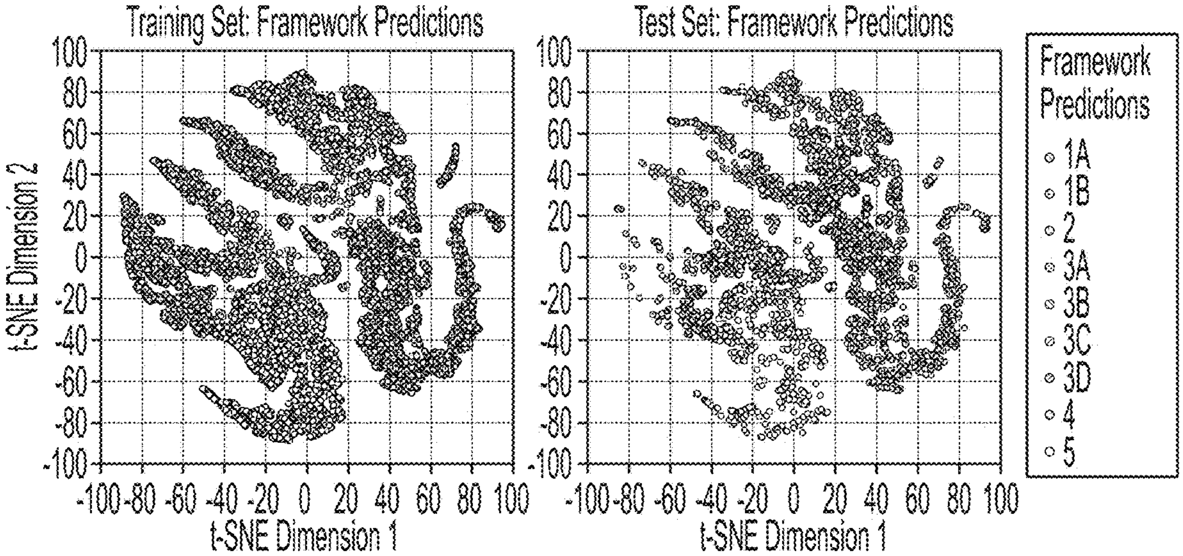
FIG. 13 (panels a and b) shows the t-SNE scatter plots of predictions on the training and test sets labeled according to their predicted PSMA-RADS categories (a) and the ground truth physician annotations (b).
Figure 13B:
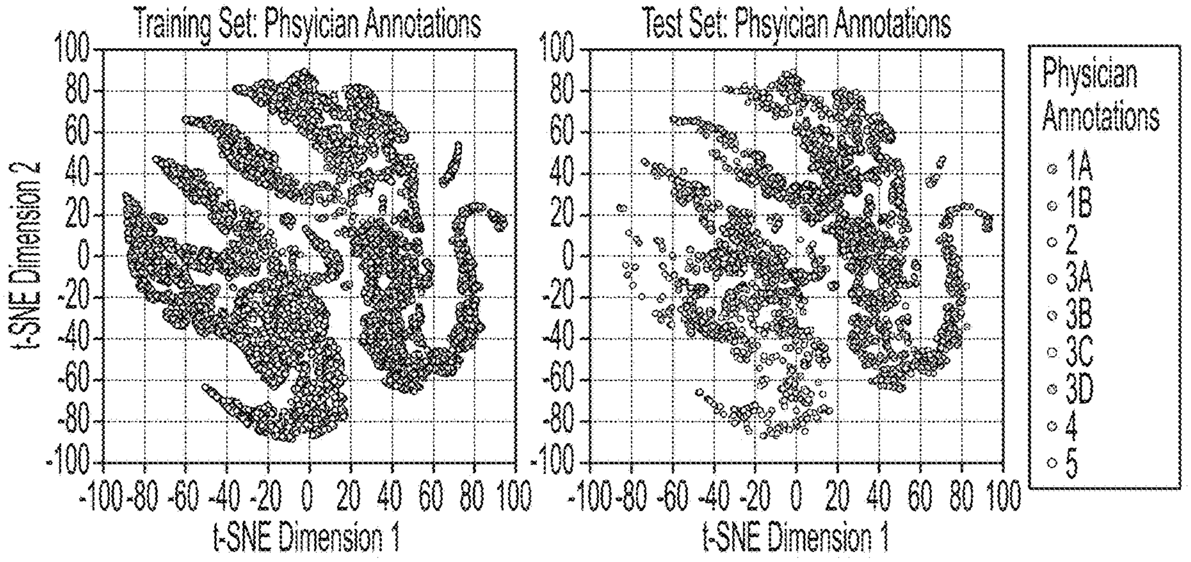

The t-SNE scatter plots of the framework's predictions on the training and test sets are shown in FIG. 13. The predictions in t-SNE space were labeled according to their predicted PSMA-RADS categories (FIG. 13*a*). The framework formed well-defined clusters of its predictions in t-SNE space. These clusters were preserved when labeled according to the ground truth physician manual annotations (FIG. 13*b*).

Figure 14A:
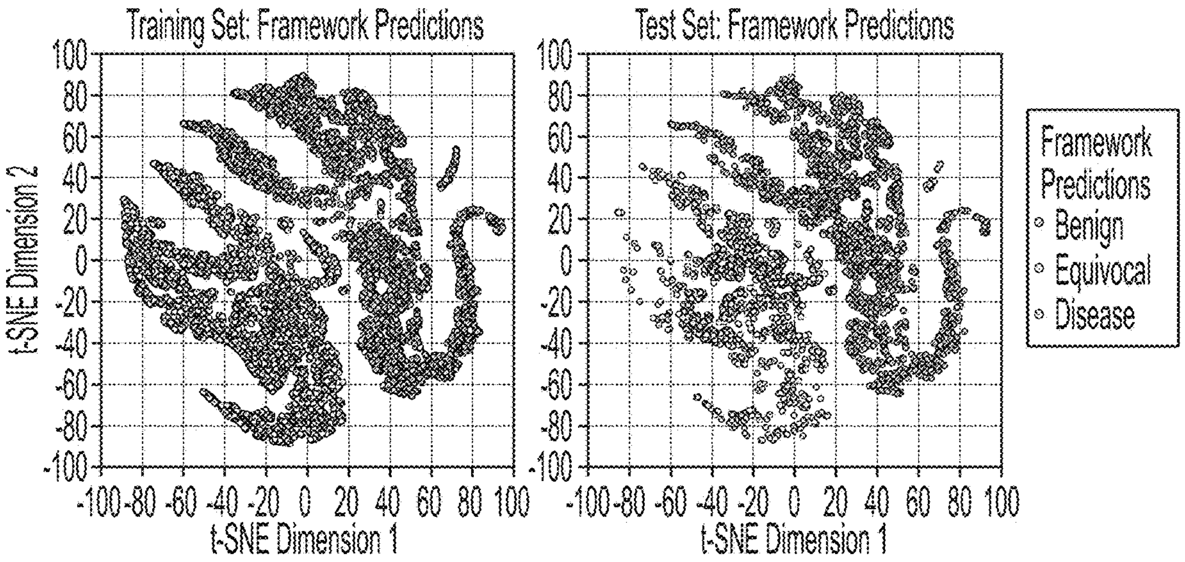
FIG. 14 (panels a and b) shows the t-SNE scatter plots of predictions on the training and test sets labeled according to their predicted PSMA-RADS categories corresponding to benign, equivocal, and disease findings (a) and the ground truth physician annotations (b).
Figure 14B:
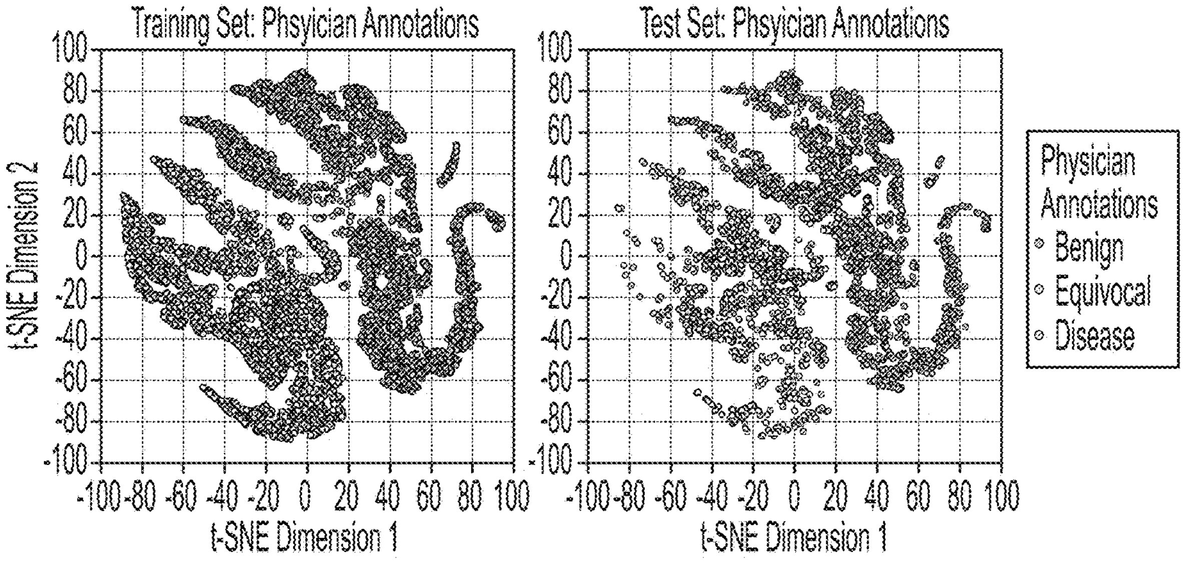

In addition to learning the local relationships within the individual PSMA-RADS subcategory clusters, the framework learned the global relationship between broad clusters corresponding to benign, equivocal, and disease findings (FIG. 14). For example, predictions belonging to PSMA-RADS-1A, -1B, and -2 were clustered together in the upper right triangle of the t-SNE space and formed a global cluster that corresponded to benign or likely benign findings. Similarly, predictions belonging to PSMA-RADS-4 and -5, which corresponded to findings that were highly likely or almost certainly PCa, were closely clustered in the lower left triangle of the t-SNE space.

While the broad clusters corresponding to benign and disease findings were clearly separated on the t-SNE scatter plots (FIG. 14), the cluster corresponding to equivocal findings was less well-defined. This is likely because the PSMA-RADS-3 category is the most complex designation in the PSMA-RADS framework. Predictions corresponding to equivocal findings belonging to PSMA-RADS-3A, -3B, and -3D were closely clustered next to the disease findings cluster at the center of the t-SNE space between the two global clusters of benign and disease findings (FIG. 13*a*). This reflects the uncertainty for those equivocal findings on their compatibility with PCa. Interestingly, PSMA-RADS-3C predictions were clustered near PSMA-RADS-1B and -2 predictions (FIG. 13*a*). This may be because regions of uptake corresponding to PSMA-RADS-3C are atypical for PCa and are likely to be a number of other non-prostate malignancies or benign tumors.

A Confidence Score for Prostate Cancer Classification

Figure 15:
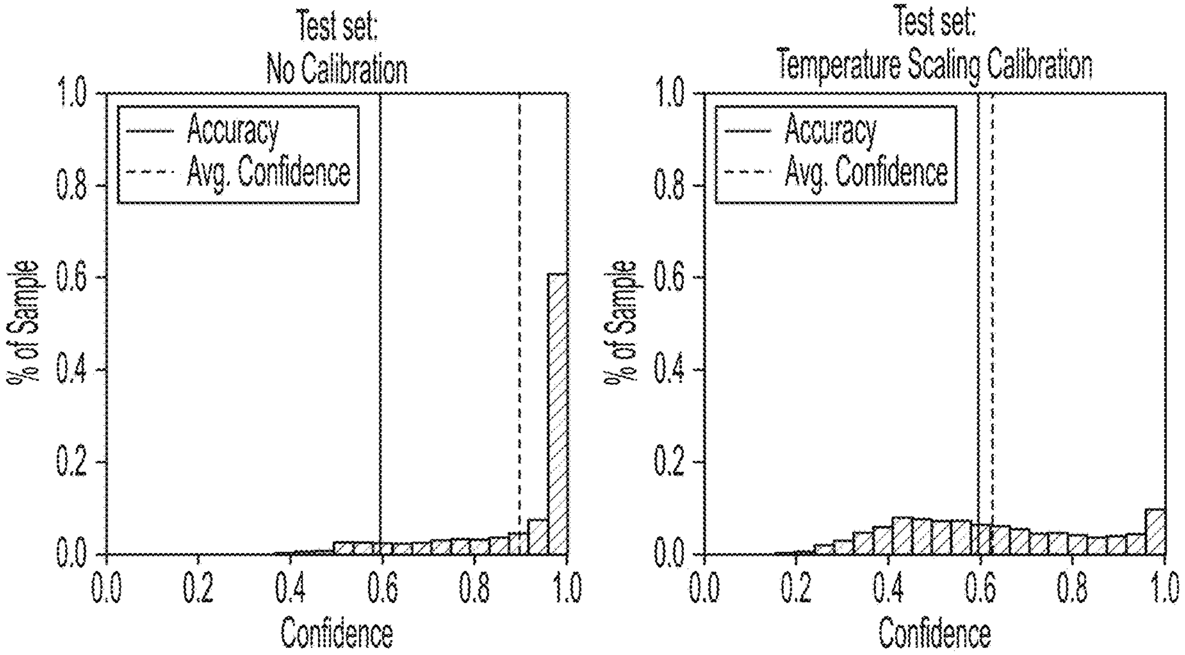
FIG. 15 compares the average confidence to expected accuracy before (left) and after (right) temperature scaling model calibration on confidence histograms.

The optimal temperature for temperature scaling was found to be $T=4.26$ on the validation set. Temperature scaling calibration was performed on the test set to yield confidence scores for each prediction. Confidence histograms of the framework's level of confidence for predictions on the test set before and after performing temperature scaling calibration are shown in FIG. 15. Before calibration, the average confidence of the framework was 0.90. After calibration, the average confidence of the framework was 0.63 and was much closer to the framework's overall accuracy of 0.61. A confidence histogram comparing correct and incorrect predictions was shown in FIG. 16. The mean confidence scores were significantly higher ($P<0.05$) for correct predictions (0.68) than for incorrect predictions (0.55). The distribution of confidence scores of the framework's predictions was shown on t-SNE scatter plots in FIG. 17. The framework was less confident of predictions closer to the boundaries between individual PSMA-RADS subcategory clusters and more confident of predictions farther away from those boundaries.

Discussion

The framework classified lesions on $^{18}$F-DCFPyL PET according to the PSMA-RADS categorization scheme and provided accurate lesion-level and patient-level predictions. The framework yielded an overall accuracy of 0.71 (539/760 correctly classified lesions) and an F1 score of 0.71 on the validation set indicating accurate lesion-level classification. On the test set, the framework yielded an overall accuracy of 0.61 (447/732) and an F1 score of 0.61 for lesion-level predictions. While the lesion-level performance on the test set was worse compared to the validation set, this is likely due to the out-of-patient-distribution nature of the test set.

The framework maintained a similar level of performance on the test set compared to the validation set across the PSMA-RADS categories, with the exception of PSMA-RADS-3D lesions, which were largely misclassified as PSMA-RADS-3A lesions (FIG. 9). However, these cases of inaccuracy would not affect the recommendation suggested by the PSMA-RADS framework as further work-up or follow-up imaging would be required for PSMA-RADS-3A and -3D lesions. Interestingly, most lesions (4/7) incorrectly classified as PSMA-RADS-3D lesions on the test set were PSMA-RADS-1A lesions (FIG. 9*b*). This is likely because PSMA-RADS-3D lesions lack uptake on PSMA PET imaging despite representing potential malignancy on anatomic imaging. Similarly, most lesions (5/7) incorrectly classified as PSMA-RADS-3C lesions were PSMA-RADS-1B and -2 lesions (FIG. 9*b*). These observations were corroborated in the t-SNE analysis (FIG. 13) and reflect the complexity of the PSMA-RADS-3 designation.

For patient-level predictions, the framework achieved an overall accuracy of 0.77 (41/53 correctly classified patients) and an F1 score of 0.76 on the test set indicating accurate patient-level PSMA-RADS classification. Most misclassified patients (7/12) were predicted to belong to a higher PSMA-RADS category relative to their true class (FIG. 11*a*). In cases of inaccuracy, it would be preferable to overestimate the likelihood of PCa to prevent delays in diagnosis and subsequent treatment. Indeed, 8/12 incorrectly classified cases were predicted as PSMA-RADS-4 or -5. The framework yielded a higher overall accuracy of 0.81 (43/53) and a higher F1 score of 0.82 for patient-level predictions when using the CNN-predicted tissue types as opposed to the manually annotated tissue types as inputs, highlighting the robustness of the framework.

Figure 16:
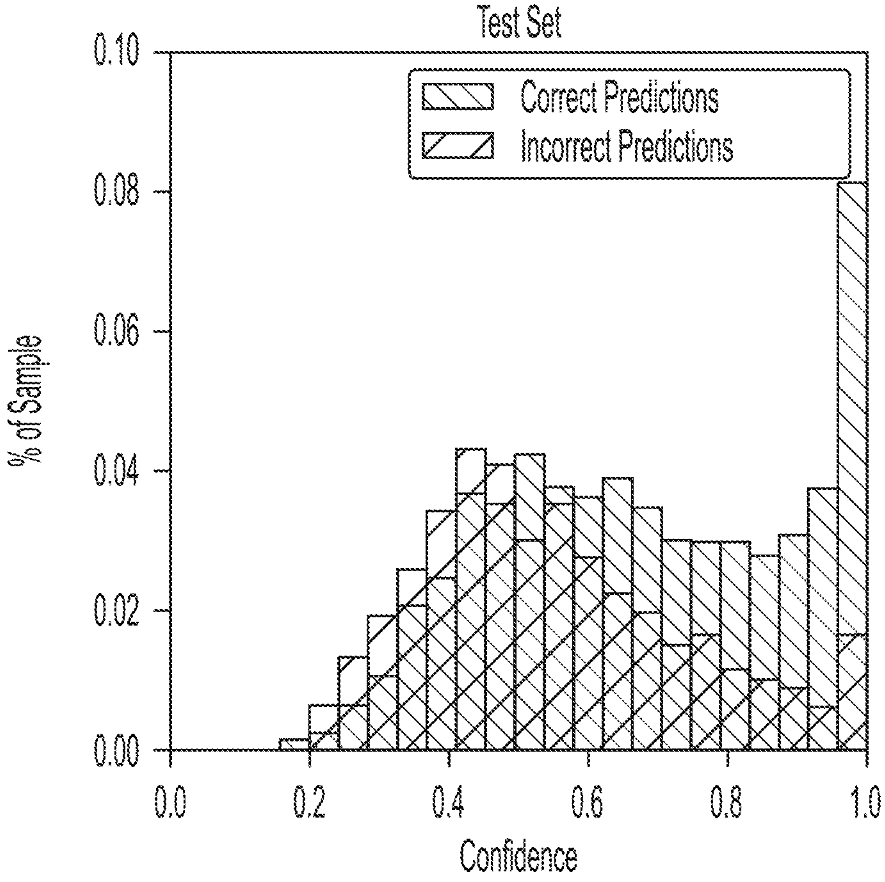
FIG. 16 shows a confidence histogram for correct and incorrect predictions.
Figure 17:
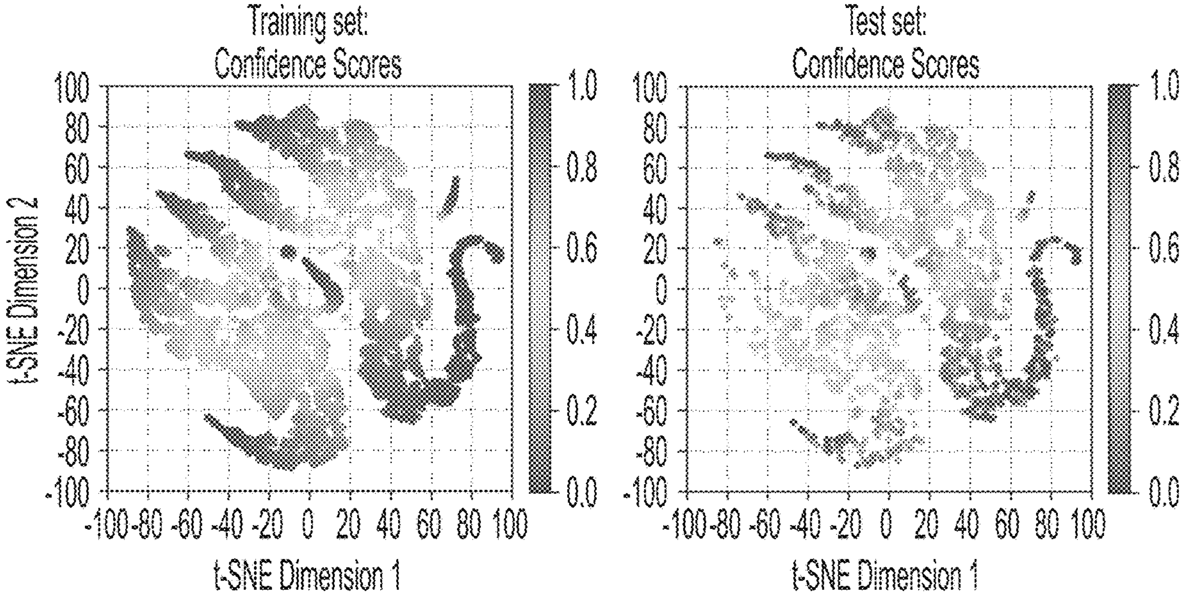
FIG. 17 shows the confidence scores depicted on t-SNE scatter plots.

Unlike the typical black-box nature of DNNs, our framework was interpretable. The framework's predictions in t-SNE space were clustered and revealed both a local and global structure consistent with the PSMA-RADS categorization scheme (FIG. 13). The t-SNE analysis provided evidence that the framework learned the relationship between the individual PSMA-RADS categories and the broad categories of benign, equivocal, and disease findings (FIG. 14). The framework provided a confidence score for each prediction, which may help radiologists further interpret the output of the framework to make a more informed clinical diagnosis (FIG. 15, FIG. 16, and FIG. 17). For example, when the framework has a high level of uncertainty for a given prediction, this could serve as a flag for physicians to put less weight on the framework output or to take a second look when determining diagnosis. The confidence score may assist in better defining how patients should be treated when they appear to have limited volume recurrent or metastatic disease and are being considered for metastasis-directed therapy (Phillips R, Shi W Y, Deek M, Radwan N, Lim S J, Antonarakis E S, Rowe S P, Ross A E, Gorin M A and Deville C 2020 Outcomes of observation vs stereotactic ablative radiation for oligometastatic prostate cancer: the ORIOLE phase 2 randomized clinical trial *JAMA Oncol.* 6 650-9).

Results highlighted the importance of combining the CNN-extracted features, radiomic features, and tissue type information for the classification task (FIG. 7). The tissue type information at the anatomic location of the lesions was found to be especially important in improving the overall performance of the method (FIG. 7 and Table 4). Incorporating CT imaging would allow the framework to further extract relevant anatomic information for the classification task. A limitation is that the boundary of each lesion is pre-defined by manual segmentation. In lesions with low uptake on the PET image, there may be a need to incorporate CT information to better inform the classification task. While performing textural analysis is challenging on PET due to limited spatial resolution, incorporating higher-order radiomic features, such as grey-level co-occurrence matrix, from CT imaging may help further improve performance. Further, expanding the methodology to include the whole imaged volume, as opposed to the cropped images, may improve accuracy for the classification task by providing additional anatomic context for the lesions. For example, the presence of other lesions in the chest or abdomen regions may be considered when classifying a lesion as belonging to the PSMA-RADS-3C category and may improve classification accuracy in these cases. Additionally, training the framework using an ensemble learning approach may also help to improve performance as such meta-learning approaches have been shown to improve performance over single models for medical image classification and prognostic tasks.

The framework predictions were evaluated on the PSMA-RADS classification task and validated against the assigned PSMA-RADS categories observed by a single nuclear medicine physician. While validation against a true gold standard is out of the scope of the present study, further validation of the framework by, for example, histopathological validation or a consensus study done by multiple experienced readers is an important area of research for the clinical translation of the framework. The performance of the framework may be impacted by the quality of the manual segmentations as well as any inter-operator variability that may have been present in the segmentations across the different readers. Since radiomic features are extracted from segmented lesions, the segmentations must be reliable and consistent to accurately capture clinically relevant radiomic features. While the present study focuses on PSMA-RADS classification rather than detection or segmentation, the incorporation of the automated lesion detection and segmentation tasks is important for the clinical adoption of the framework (Leung K, Ashrafinia S, Sadaghiani M S, Dalaie P, Tulbah R, Yin Y, VanDenBerg R, Leal J, Gorin M and Du Y 2019 A fully automated deep-learning based method for lesion segmentation in 18F-DCFPyL PSMA PET images of patients with prostate cancer J. Nucl. Med. 60 399; Leung K H, Marashdeh W, Wray R, Ashrafinia S, Pomper M G, Rahmim A and Jha A K 2020 A physics-guided modular deep-learning based automated framework for tumor segmentation in PET *Phys. Med. Biol.*). For example, incorporating a DL-based lesion detection approach into the framework could help identify regions of uptake corresponding to disease that may be missed by the radiologist. The framework may also be further automated by incorporating a DL-based segmentation process into the workflow. In cases where high-quality segmentations are unavailable, the framework that was only given PET images and tissue type information as inputs, which had the second-best performance compared to the framework given all inputs (FIG. 7), may be acceptable for usage. The framework that was given only images and CNN-predicted tissue types as inputs yielded an overall accuracy of 0.74 (39/53) and an AUROC value of 0.91 for patient-level predictions on the test set, indicating accurate prediction (FIG. 11 and Table 10). This automated approach has the added advantage of only requiring PET images as input.

The performance of the framework is affected by the class imbalance across the dataset on both a per-lesion and per-patient basis when considering the number of lesions and overall PET scans from each PSMA-RADS category (FIG. 5). For instance, PSMA-RADS-3C and -3D categories, which had the lowest performance, also had the fewest lesions in the entire dataset (Table 6). Most scans had an overall PSMA-RADS score of either PSMA-RADS-4 or -5 further contributing to the class imbalance of the data on a patient level. To combat class imbalances in the training data, generative adversarial networks could be leveraged to generate a large amount of simulated data to train the framework. (Kazuhiro K, Werner R A, Toriumi F, Javadi M S, Pomper M G, Solnes L B, Verde F, Higuchi T and Rowe S P 2018 Generative Adversarial Networks for the Creation of Realistic Artificial Brain Magnetic Resonance Images *Tomography* 4 159).

Conclusion

A DL and radiomics-based framework for automated PSMA-RADS classification on PSMA PET images was developed and provided accurate lesion-level and patient-level predictions. A t-SNE analysis revealed learned relationships between the PSMA-RADS categories and disease findings on PSMA PET scans. The framework was interpretable and provided a well-calibrated measure of confidence for each prediction.

Example 2: An Ensemble-Based Deep Learning and Radiomics Framework for Classification of Prostate Cancer Lesions on PSMA-Targeted Pet Methods PSMA PET/CT Data Data from 267 patients were imaged with $^{18}$F-DCFPyL PET/CT at 60 min post-injection. The images were acquired across two different scanners: GE Discovery RX (GE Healthcare, Waukesha, WI, USA) (N=1,023) and Siemens Biograph mCT (Siemens Healthineers, Erlangen, Germany) (N=2,771). The PET images acquired from each scanner had comparable spatial resolution and image noise characteristics. Lesions were identified and manually segmented by four trained nuclear medicine physicians on a per-slice basis in the axial view. Each segmented lesion was assigned to one of 9 possible PSMA-RADS categories (Table 1, above) by a nuclear medicine physician. These manual categorizations were used as ground truth. The PET and CT images were both utilized during the manual segmentation and classification of PCa lesions. The dataset consisted of 3,794 PCa lesions that were randomly partitioned into training, validation and test datasets containing 2,656, 569 and 569 lesions, respectively, using a 70%/15%/15% split.

Ensemble-Based DL and Radiomics Framework

Figure 18A:
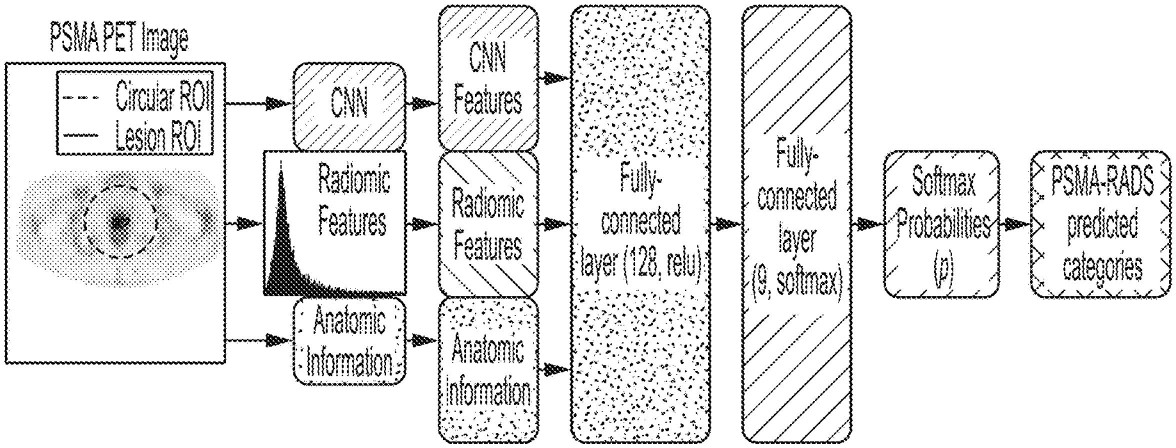
FIG. 18 (panels a-c) schematically show the complete network architecture (a), the detailed CNN architecture (b), and the ensemble DL framework (c).

An ensemble-based DL and radiomics framework was developed in the context of classifying lesions in PSMA PET images of patients with PCa into the appropriate PSMA-RADS version 1.0 categories (Rowe S P, Pienta K J, Pomper M G and Gorin M A 2018 PSMA-RADS version 1.0: a step towards standardizing the interpretation and reporting of PSMA-targeted PET imaging studies *Eur. Urol.* 73 485). The framework takes three sets data as inputs: an input PET image axial slice containing a PCa lesion as well as the manual segmentation of that lesion as a binary mask, radiomic features extracted from that lesion, and anatomical location information about the lesion (FIG. 18*a*). A convolutional neural network (CNN) extracted lesion features from the PET image relevant for the classification task directly from the PET image (FIGS. 18*a* and *b*).

Figure 18B:
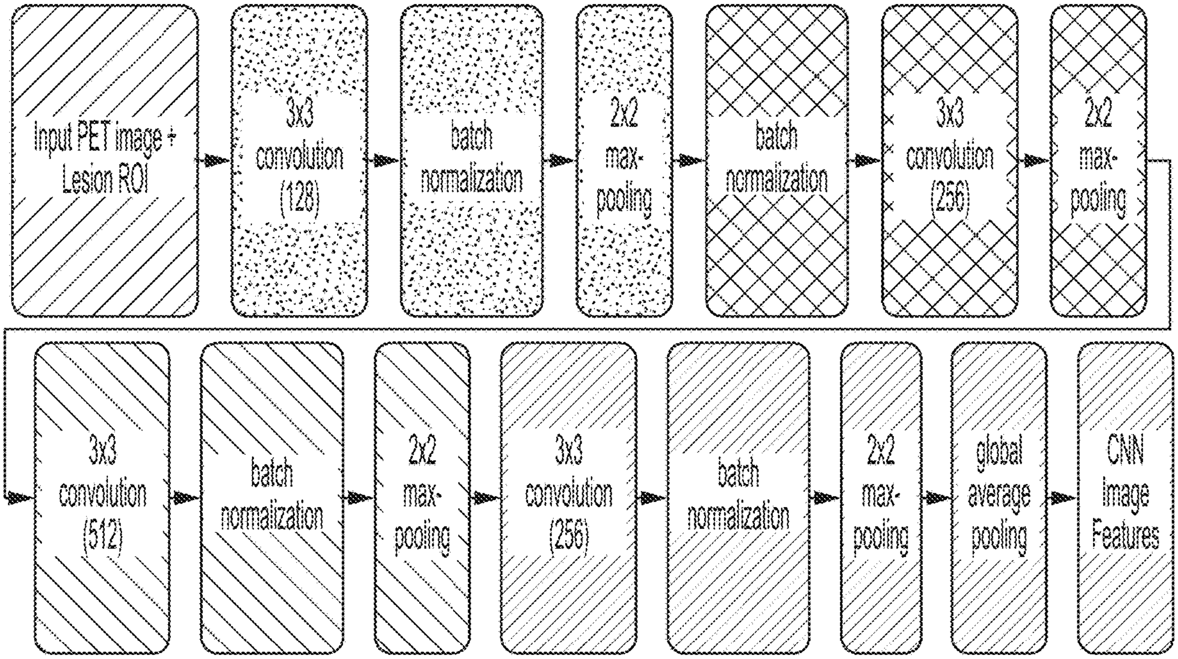

The axial PET image slice containing the whole field-of-view (FOV) was used as input to the CNN. Along with the PET image, the delineated lesion was also given as inputs to the CNN as a binary mask. This was done to provide additional local context for the network and to allow the network to identify which lesion to classify in the case of having multiple lesions present in a single image slice. The CNN architecture is shown in FIG. 18*b*. Batch normalization followed by element-wise dropout was applied after each convolutional layer (Goodfellow I, Bengio Y and Courville A 2016 Deep learning (MIT press)). This was done to regularize the network and prevent overfitting during training. A dropout probability of 0.1 were applied after all convolutional and fully-connected layers. Convolutional and fully connected layers were followed by a ReLU activation function. The last output layer was followed by a softmax activation function (FIG. 18*a*).

Radiomic features were extracted from the manual segmentation around the lesion. The manual segmentations defined pixels that belonged to the lesion. A circular region of interest (ROI) around the lesion defined the background pixels. Radiomic features that might be missed by the CNN were extracted from the lesion and circular ROIs (FIG. 18*a*). Radiomic features were then extracted from the PCa lesions on a 2D per-slice basis to directly capture lesion intensity and morphology characteristics. Features that captured intensity characteristics included the mean and variance of lesion intensity, mean and variance of lesion background intensity, lesion-to-background ratio, and the maximum standardized uptake value (SUV) within the lesion. Morphological features included lesion volume, circularity, solidity and eccentricity measures.

The anatomical information about the lesion was included in the framework. The recorded anatomical information for each lesion were categorized into one of 4 broad anatomic categories, including that of bone, prostate, soft tissue, and lymphadenopathy. These anatomical categories were encoded as one-hot-vectors. The CNN extracted and radiomic lesion features were combined with anatomical information about the lesion were passed into two fully connected layers with a softmax activation function following the last layer (FIG. 18*a*). The final output of the network consisted of softmax probabilities (AUEB M T R C 2016 One-vs-each approximation to softmax for scalable estimation of probabilities *Advances in Neural Information Processing Systems* pp 4161-9) indicating the likelihood of belonging to one of 9 PSMA-RADS categories.

Figure 18C:
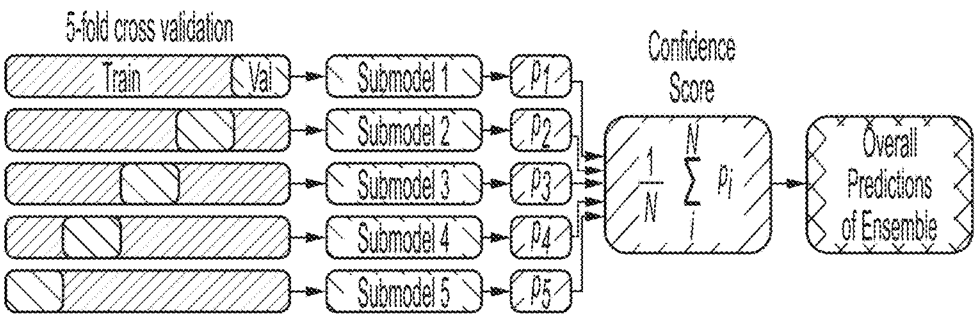
Figure 19A:
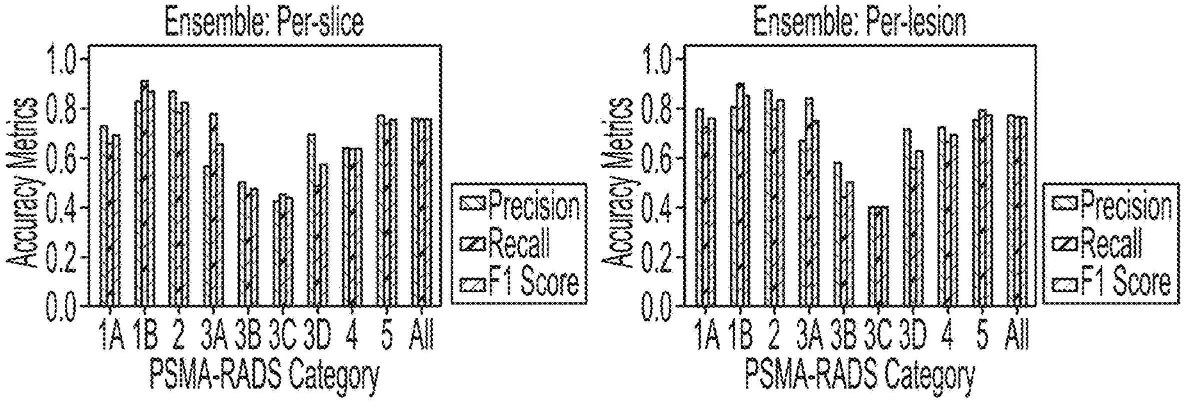
FIG. 19 (panels a-d) show the overall accuracy, precision, recall, F1 scores (a), confusion matrices (b), ROC curves (c), and Precision-Recall curves (d) with area under the curve (AUC) values.
Figure 19B:
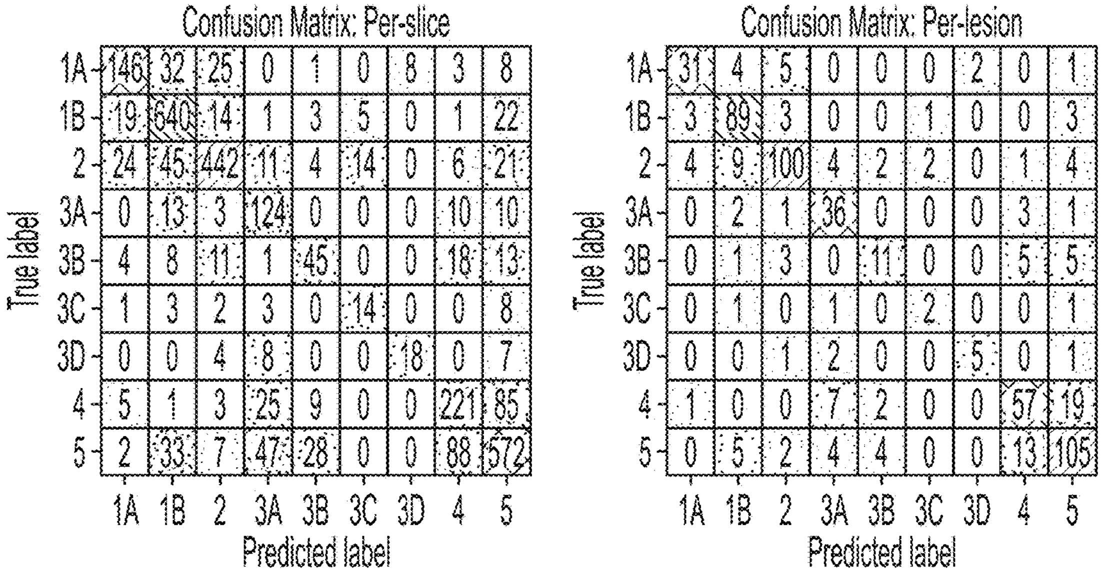
Figure 19C:
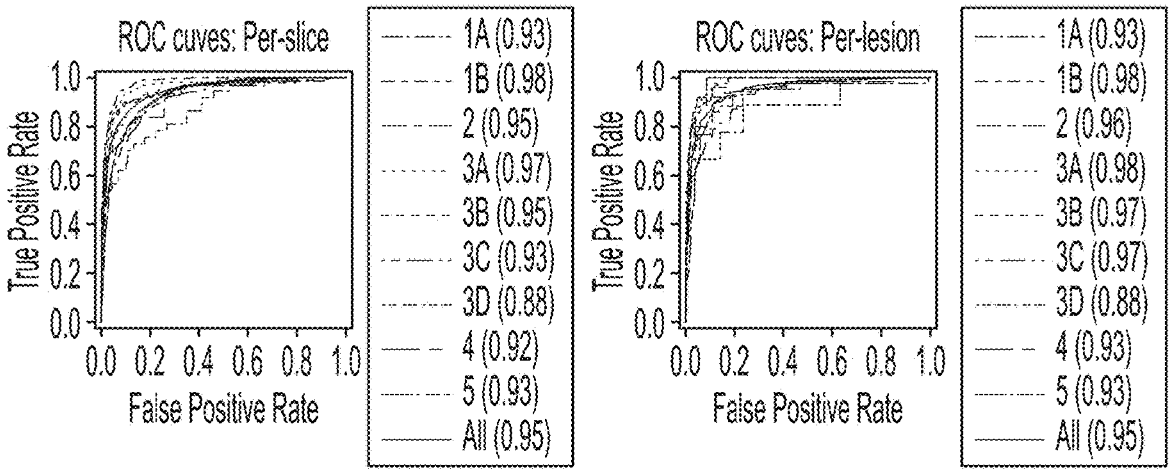
Figure 19D:
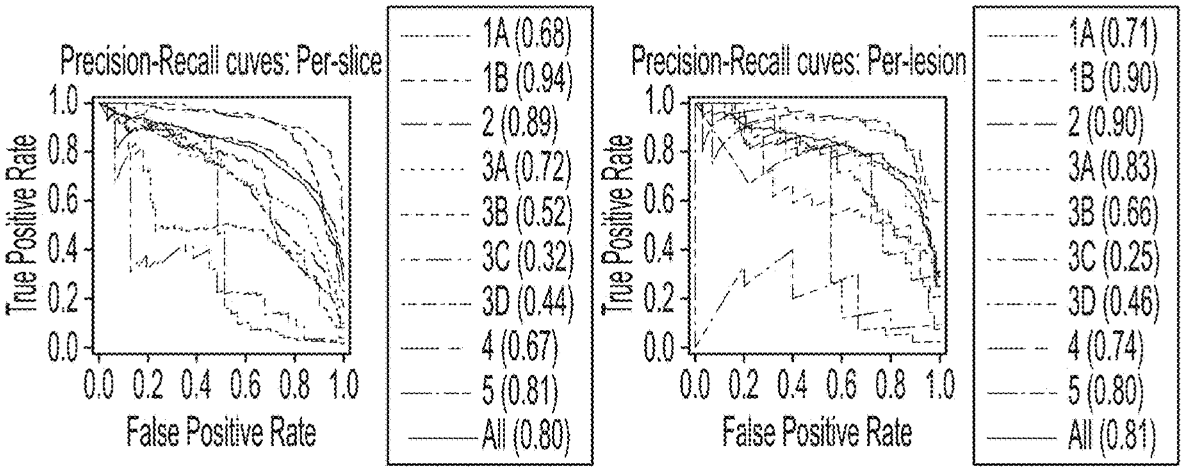

Ensemble Learning and a Confidence Score for PSMA-RADS PCa Lesion Classification The framework was trained via a 5-fold cross-validation which generated an ensemble of 5 CNN submodels (FIG. 18*c*). In the 5-fold cross-validation, 4 of the data folds are used to train the framework and validated on the remaining validation fold. The training process was repeated five times to yield five CNN submodels that were each trained on a different subset of the training data. This ensemble of networks then predicts the appropriate PSMA-RADS category for a PET image slice by majority vote classification. Prediction can be done on both a per-slice and a per-lesion basis. Prediction on a per-slice basis was performed by taking a majority vote across the 5 CNNs in the ensemble. Prediction on a per-lesion basis was performed by taking a majority vote across the 5 CNNs in the ensemble and across all slices belonging to the same lesion. A soft majority voting scheme was used where the predicted softmax probabilities for each class are averaged across all 5 models in the ensemble where the sample is classified as belonging to the class with the highest average softmax probability (FIG. 18*c*). In contrast to a typical DL-based approach where only a single model is used to perform prediction, the present study uses an ensemble of multiple submodels to inform prediction.

In addition to the PSMA-RADS classification, the proposed ensemble-based framework also provides a measure of how confident it is in its prediction. The confidence measure was defined as the resulting average softmax probability for the predicted class across all submodels (FIG. 18*c*). For per-slice evaluation, the confidence measure is averaged across all submodels for each PET image slice containing a lesion. For per-lesion evaluation, the confidence measure is averaged across all submodels and all slices belonging to the same lesion.

Training and Optimization of the Proposed Method

The hyperparameters of the network architecture of the proposed ensemble framework were optimized on the training and validation datasets. The framework was trained by optimizing a class-weighted categorical cross-entropy loss function that quantified the error between the observed and true PSMA-RADS categorizations (King G and Zeng L 2001 Logistic regression in rare events data *Polit. Anal.* 9 137-63). The network was optimized via a first-order gradient-based optimization algorithm, Adam (Kingma D and Ba J 2014 *Adam: A Method for Stochastic Optimization*). Early stopping based on monitoring the error on the validation set was applied to prevent overfitting during training (Goodfellow I, Bengio Y and Courville A 2016 *Deep learning* (MIT press)).

Data processing was performed in Python 3.6.8 and MATLAB 2019b. The network architecture and training were implemented in Python 3.6.8, TensorFlow 1.13.1, and Keras 2.2.5. Experiments were run on an NVIDIA Tesla K40 GPU and a Linux CentOS 5.10 operating system.

Evaluation on the Test Set

The training and validation sets were combined and used to perform a 5-fold cross-validation on the proposed ensemble-based framework. The trained ensemble was then evaluated on the independent test set. The framework was also evaluated on both a per-slice and per-lesion basis by assessing several evaluation metrics, including overall accuracy, precision, recall, and F1 score. Overall accuracy was defined as the number of correctly classified observations divided by the total number of observations. Overall accuracy was computed across examples from all classes. Precision is defined as the number of true positives over the number of true and false positives. Recall is defined as the number of true positives over true positives and false negatives. The F1 score is defined as the harmonic mean of precision and recall. Precision, recall, and F1 score were computed on a per-class basis. To account for class imbalances, the overall averaged measures of precision, recall and F1 score were also computed for each individual class and weighted by the fraction of true instances for each class. The receiver operating characteristic (ROC) curves and AUROC values were reported. The precision-recall curves and the area under the precision-recall curve (AUPRC) values were also reported. The confusion matrix for each case was also reported. The framework was evaluated on both a per-slice and per-lesion basis.

Confidence scores were reported for predictions made on a per-slice and per-lesion basis. Boxplots of confidence scores for the predicted PSMA-RADS category when the proposed framework yielded accurate predictions were compared that when the framework yielded inaccurate predictions. Boxplots of the confidence scores for each predicted PSMA-RADS category were also shown on a per-class basis. The box in the boxplot extends from the lower to upper quartile values of confidence scores and the whiskers extend from the box to show the range. Statistical significance was determined using a two-tailed t-test where a $P<0.05$ was used to infer a statistically significant difference.

Comparing the Proposed Ensemble-Based Framework to Each Submodel

The performance of the proposed ensemble-based framework was compared to the individual performances of each submodel which the ensemble comprises. There are 5 submodels that make up the full ensemble. Submodels 1, 2, 3, 4, and 5 are referred to as SM1, SM2, SM3, SM4, and SM5. E5 refers to the proposed ensemble-based method that uses all 5 submodels. The performance of the full ensemble-based framework and each submodel was evaluated on the basis of overall accuracy, precision, recall, and F1 score. Overall accuracy was computed across all PSMA-RADS categories. Precision, recall, F1 score, AUROC, and AUPRC values were computed by averaging those measures across all classes with a weighted average accounting for the fraction of true instances for each class. The performance of the proposed ensemble-based framework and each submodel were evaluated on both a per-slice and per-lesion basis.

Varying the Number of Submodels in the Ensemble

The performance of the proposed ensemble-based framework was evaluated when varying the number of submodels used in the ensemble to yield the overall prediction. The full proposed ensemble-based method consists of 5 submodels and is referred to as E5. The ensembles consisting of 1, 2, 3, and 4 submodels are referred to as E1, E2, E3, and E4, respectively. E1 is equivalent to performing prediction with a single submodel. The trend in performance as the number of submodels in the ensemble increased was evaluated on the basis of overall accuracy, precision, recall, F1 score, AUROC, and AUPRC values across all classes.

Results

Characterization of the Dataset

The full dataset contained 3,794 lesions where each patient had approximately 14 lesions on average. The data consisted of 294, 637, 835, 345, 147, 31, 43, 619, and 843 lesions that were manually categorized by a nuclear medicine physician as belonging to the PSMA-RADS 1A, 1B, 2, 3A, 3B, 3C, 3D, 4, and 5 categories, respectively. Additionally, anatomical information describing the tissue type and location were recorded for each lesion. There were 898, 1,873, 127, and 896 lesions with an anatomic location of bone, lymphadenopathy, prostate, and soft tissue, respectively.

Evaluation of the Framework on the Test Set

Results for evaluating the proposed framework on the test set are shown in FIG. 19 and Table 11. The proposed ensemble-based framework yielded an overall accuracy of 0.75 (95% CI: 0.74, 0.77) and 0.77 (95% CI: 0.73, 0.81) for per-slice and per-lesion evaluation, respectively. The proposed framework yielded a precision, recall, F1 score, AUROC, and AUPRC values of 0.76, 0.75, 0.75, 0.95, and 0.81 respectively, for per-slice evaluation across all PSMA-RADS categories. The proposed framework yielded a precision, recall, F1 score, AUROC, and AUPRC values of 0.77, 0.77, 0.76, 0.95, and 0.81 respectively, for per-lesion evaluation across all PSMA-RADS categories. The individual values for precision, recall and F1 scores for each PSMA-RADS category are shown in FIG. 19*a* and Table 11. Confusion matrices are shown for per-slice and per-lesion evaluation in FIG. 19*b*. ROC curves and AUROC values for each class and over all classes are shown in FIG. 19*c*. Precision-Recall curves and AUPRC values for each class and over all classes are shown in FIG. 19*d*.

TABLE 11

| PSMA-RADS Category | Confidence Score | Precision | Recall | F1 Score | AUROC | AUPRC |
|---|---|---|---|---|---|---|
| | Per-slice evaluation | | | | | |
| 1A | 0.86 (0.84, 0.88) | 0.73 | 0.66 | 0.69 | 0.93 | 0.68 |
| 1B | 0.94 (0.93, 0.95) | 0.83 | 0.91 | 0.87 | 0.98 | 0.94 |
| 2 | 0.90 (0.88, 0.91) | 0.87 | 0.78 | 0.82 | 0.95 | 0.89 |
| 3A | 0.86 (0.83, 0.88) | 0.56 | 0.78 | 0.65 | 0.97 | 0.72 |
| 3B | 0.70 (0.65, 0.74) | 0.50 | 0.45 | 0.47 | 0.95 | 0.52 |
| 3C | 0.72 (0.65, 0.80) | 0.42 | 0.45 | 0.44 | 0.93 | 0.32 |
| 3D | 0.97 (0.95, 0.99) | 0.69 | 0.49 | 0.57 | 0.88 | 0.44 |
| 4 | 0.84 (0.82, 0.85) | 0.64 | 0.63 | 0.64 | 0.92 | 0.68 |
| 5 | 0.86 (0.85, 0.87) | 0.77 | 0.74 | 0.75 | 0.93 | 0.81 |
| All | 0.88 (0.87, 0.88) | 0.76 | 0.75 | 0.75 | 0.95 | 0.81 |
| | Per-lesion evaluation | | | | | |
| 1A | 0.85 (0.80, 0.91) | 0.80 | 0.72 | 0.76 | 0.93 | 0.71 |
| 1B | 0.92 (0.90, 0.95) | 0.80 | 0.90 | 0.85 | 0.98 | 0.90 |
| 2 | 0.88 (0.86, 0.91) | 0.87 | 0.79 | 0.83 | 0.96 | 0.90 |
| 3A | 0.83 (0.77, 0.88) | 0.67 | 0.84 | 0.74 | 0.98 | 0.83 |
| 3B | 0.70 (0.60, 0.80) | 0.58 | 0.44 | 0.50 | 0.97 | 0.66 |
| 3C | 0.61 (0.28, 0.94) | 0.40 | 0.40 | 0.40 | 0.97 | 0.25 |
| 3D | 0.97 (0.92, 1.00) | 0.71 | 0.56 | 0.63 | 0.88 | 0.46 |
| 4 | 0.80 (0.76, 0.84) | 0.72 | 0.66 | 0.69 | 0.93 | 0.74 |
| 5 | 0.81 (0.78, 0.84) | 0.75 | 0.79 | 0.77 | 0.93 | 0.80 |
| All | 0.84 (0.83, 0.86) | 0.77 | 0.77 | 0.76 | 0.95 | 0.81 |

Note:
Values in parenthesis corresponds to 95% confidence intervals.

Figure 20A:
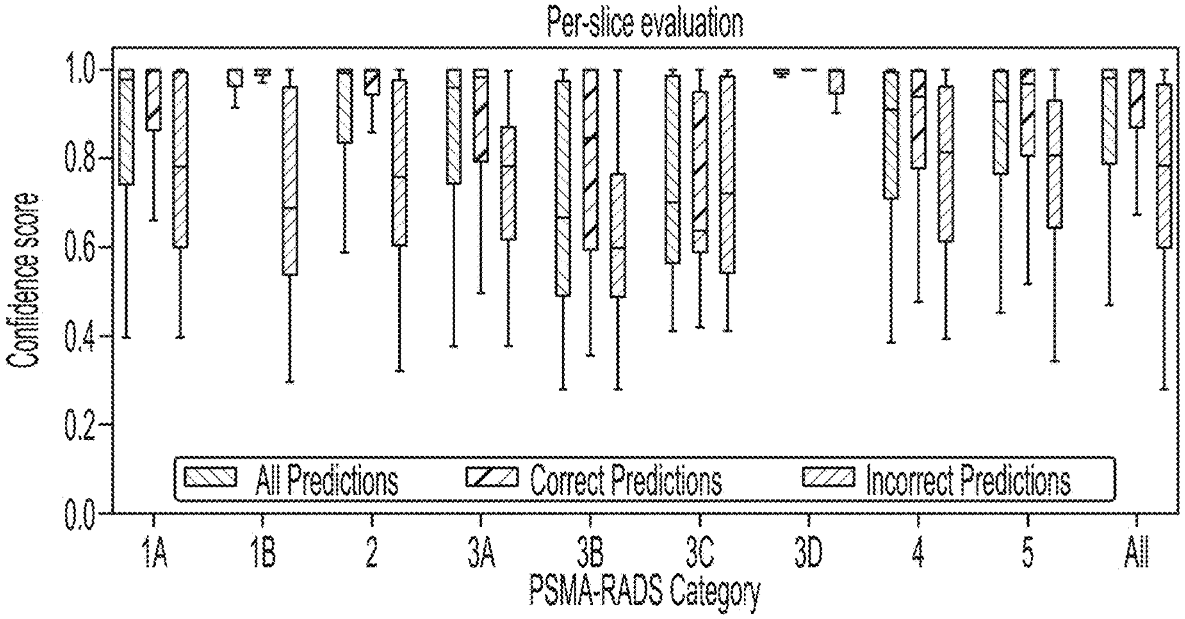
FIG. 20 (panels a and b) Boxplots for confidence scores on the test set of the proposed approach were shown for correct and incorrect predictions of the proposed approach for both per-slice (a) and per-lesion (b) evaluation.
Figure 20B:
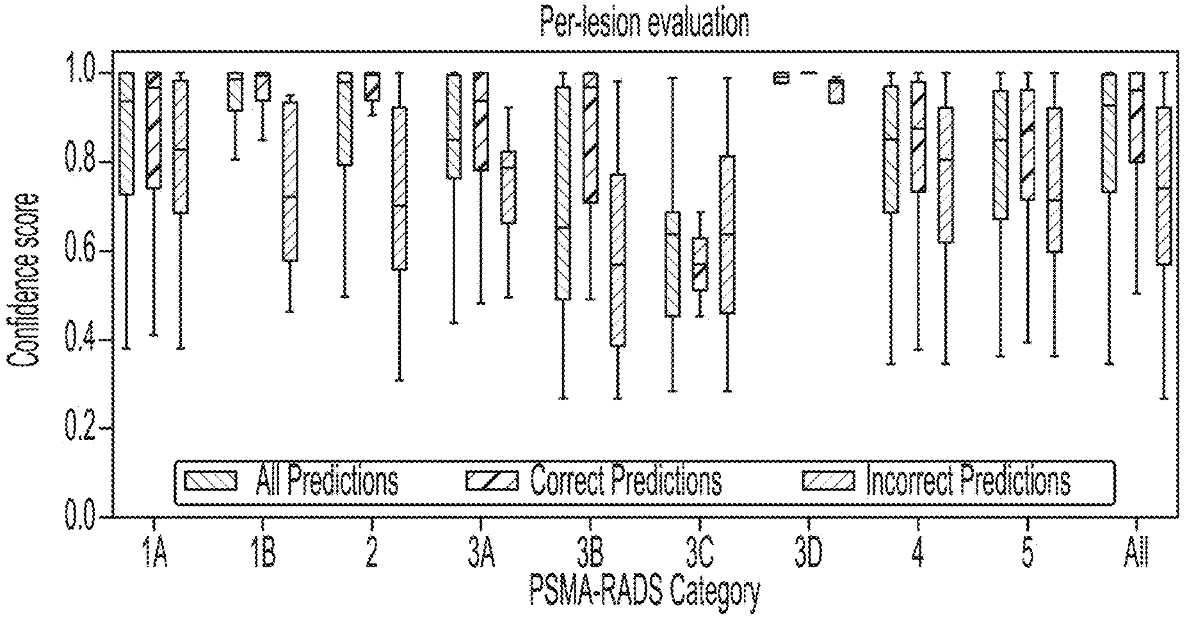

Boxplots of the confidence scores for both correct and incorrect predictions on the test set are compared in FIG. 20*a-b* and Table 11 for per-slice and per-lesion evaluation, respectively. The proposed ensemble-based framework yielded mean confidence scores of 0.91 (95% CI: 0.91, 0.92) and 0.76 (95% CI: 0.75, 0.78) for correct and incorrect predictions, respectively, when evaluating on a per-slice basis. When evaluating on a per-lesion basis, framework yielded mean confidence scores of 0.88 (95% CI: 0.86, 0.89) and 0.73 (95% CI: 0.69, 0.76) for correct and incorrect predictions, respectively. The mean confidence scores were significantly higher for correct predictions when compared to incorrect predictions for both the per-slice and per-lesion evaluation ($P<0.05$).

Boxplots of the confidence scores for each prediction according to their predicted PSMA-RADS category are shown in FIG. 20 and Table 11. In general, the proposed framework has higher confidence scores for lesions belonging to the PSMA-RADS categories where the framework achieved higher performance and vice versa on the basis of F1 score. For instance, the framework yielded the lowest F1 score of 0.40 for lesions belonging to the PSMA-RADS 3C category when evaluating on a per-lesion basis (Table 11). The framework also had the lowest mean confidence score of 0.61 for lesions predicted as belonging to the PSMA-RADS 3C category (Table 11). Similarly, the framework had the highest F1 scores of 0.87 and 0.85 for lesions belonging to the PSMA-RADS 1B category when evaluating on a per-slice and per-lesions basis, respectively. The framework had relatively high mean confidence scores of 0.94 and 0.92 for those lesions belonging to the PSMA-RADS 1B category when evaluating on a per-slice and per-lesions basis, respectively (Table 11). These results indicate that the confidence score reflects the level of certainty or confidence the framework has is in its prediction. This trend can also be visually observed when comparing FIG. 19*a* and FIG. 20.

Comparing the Framework to Each Submodel

Figure 21A:
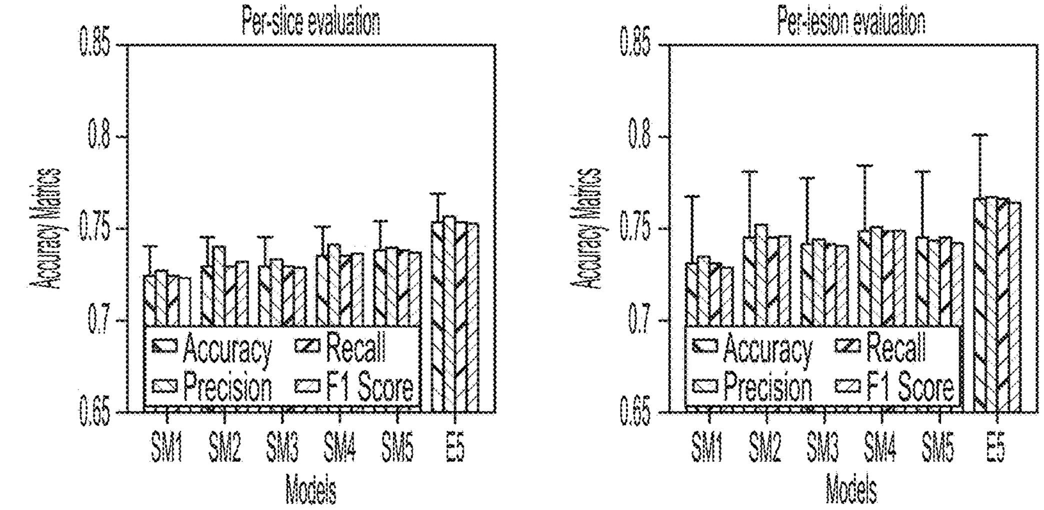
FIG. 21 (panels a-c) compare the performance of the proposed ensemble-based method (E5) to the performance of each individual submodel (SM1-SM5) on the test set on the basis of overall accuracy, precision, recall and F1 scores (a), ROC curves (b), and Precision-Recall curves (c) using both per-slice and per-lesion evaluation, respectively.
Figure 21B:
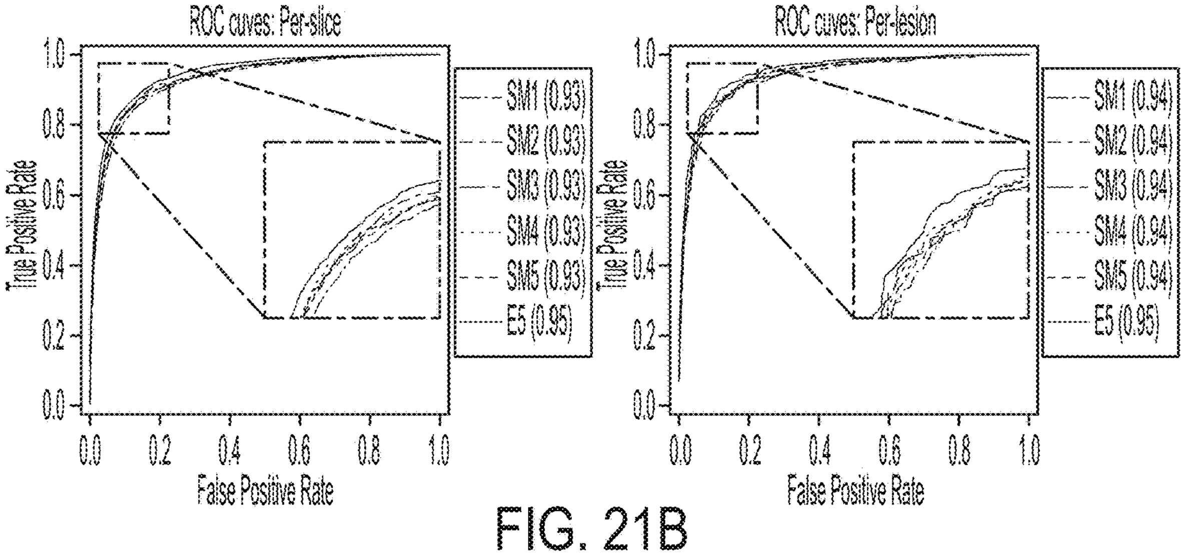
Figure 21C:
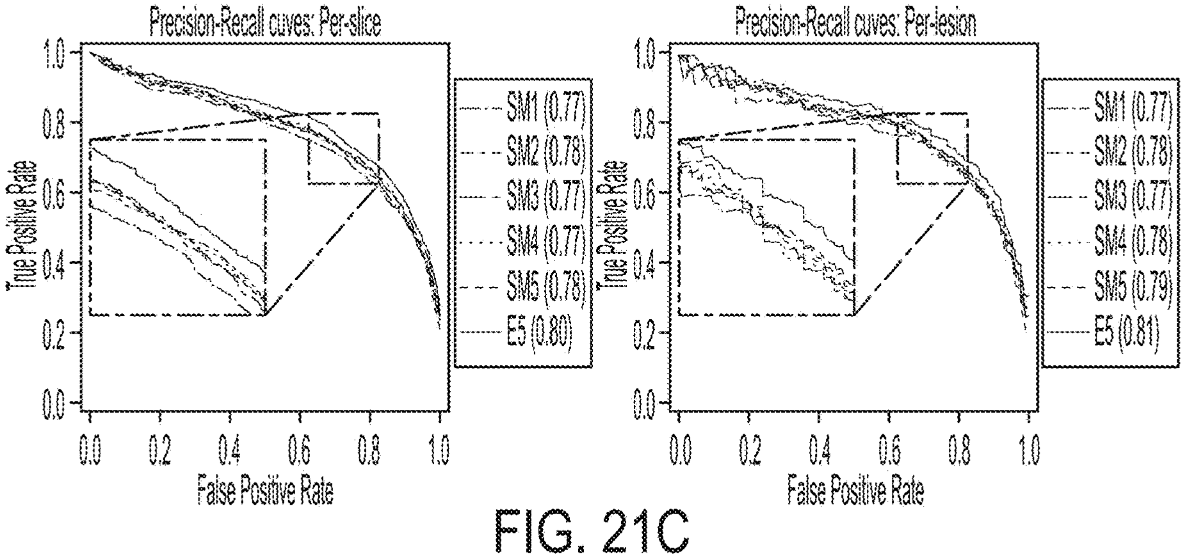

Results comparing the proposed framework to each submodel are shown in FIG. 21 and Table 12. The proposed ensemble-based framework (E5) has higher performance when compared to the performance of all submodels (SM1-SM5) on the basis of overall accuracy, precision, recall, and F1 score (FIG. 21*a-c* and Table 12) for both per-slice and per-lesion evaluation. For per-slice evaluation, the proposed ensemble-based framework significantly outperformed all submodels on the basis of overall accuracy ($P<0.05$). ROC curves, AUROC values, Precision-Recall curves, and AUPRC values comparing the performance of the proposed ensemble-based framework to each submodel is shown in FIG. 21*b-c* and Table 12. The proposed ensemble-based approach has the highest AUROC value of 0.95 and the highest AUPRC value of 0.81 when compared to that of each submodel (Table 12). A portion of the ROC curve and Precision-Recall curve plots in FIG. 21*b-c* is zoomed in to better visually distinguish the performance of the ensemble-based approach from that of each submodel.

TABLE 12

| Model | Accuracy | Precision | Recall | F1 Score | AUROC | AUPRC |
|---|---|---|---|---|---|---|
| | Per-slice evaluation | | | | | |
| SM1 | 0.72 (0.71, 0.74) | 0.73 | 0.72 | 0.72 | 0.93 | 0.77 |
| SM2 | 0.73 (0.71, 0.75) | 0.74 | 0.73 | 0.73 | 0.94 | 0.78 |

TABLE 12-continued

| Model | Accuracy | Precision | Recall | F1 Score | AUROC | AUPRC |
|---|---|---|---|---|---|---|
| SM3 | 0.73 (0.71, 0.75) | 0.73 | 0.73 | 0.73 | 0.93 | 0.77 |
| SM4 | 0.74 (0.72, 0.75) | 0.74 | 0.74 | 0.74 | 0.93 | 0.77 |
| SM5 | 0.74 (0.72, 0.75) | 0.74 | 0.74 | 0.74 | 0.94 | 0.78 |
| E5 | 0.75 (0.74, 0.77) | 0.76 | 0.75 | 0.75 | 0.95 | 0.81 |
| | Per-lesion evaluation | | | | | |
| SM1 | 0.73 (0.70, 0.77) | 0.74 | 0.73 | 0.73 | 0.94 | 0.78 |
| SM2 | 0.75 (0.71, 0.78) | 0.75 | 0.75 | 0.75 | 0.94 | 0.78 |
| SM3 | 0.74 (0.71, 0.78) | 0.74 | 0.74 | 0.74 | 0.94 | 0.77 |
| SM4 | 0.75 (0.71, 0.78) | 0.75 | 0.75 | 0.75 | 0.94 | 0.78 |
| SM5 | 0.75 (0.71, 0.78) | 0.74 | 0.75 | 0.74 | 0.94 | 0.79 |
| E5 | 0.77 (0.73, 0.81) | 0.77 | 0.77 | 0.76 | 0.95 | 0.81 |

Note:
Values in parenthesis corresponds to 95% confidence intervals.

Varying the Number of Submodels in the Ensemble

Figure 22A:
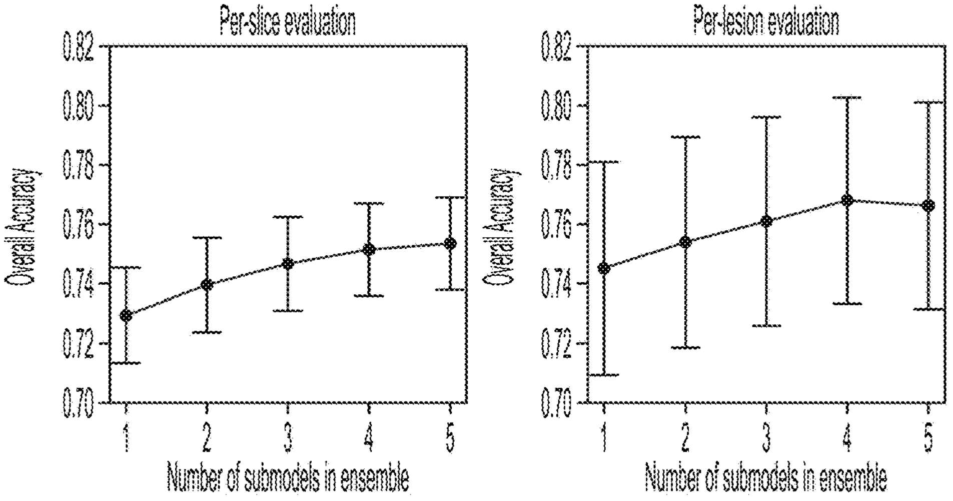
FIG. 22 (panels a-c) show the overall accuracy of the ensemble approach in the overall prediction (a), ROC curves (b), and Precision-Recall curves (c) when increasing the number of submodels on the test set using both per-slice and per-lesion evaluation, respectively.
Figure 22B:
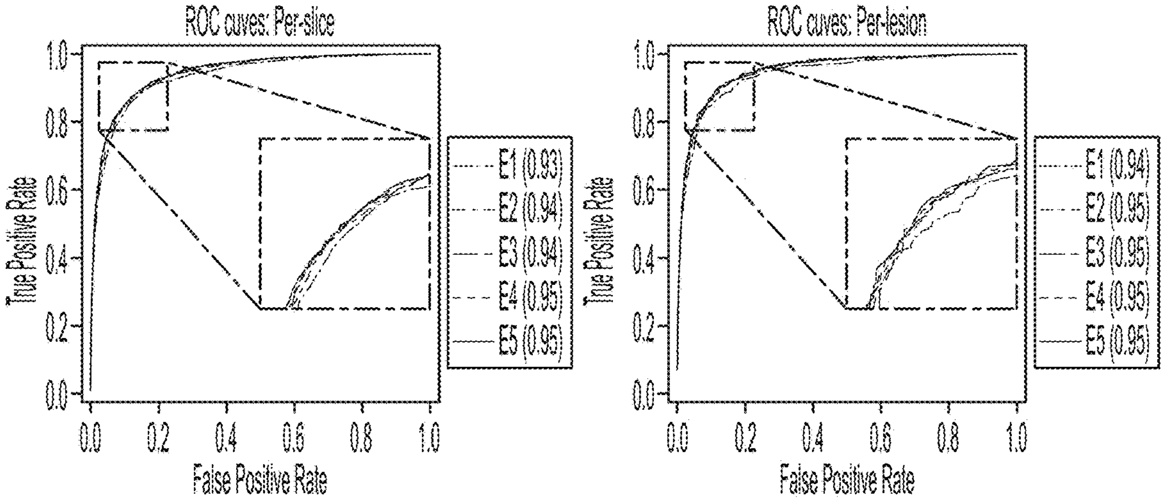
Figure 22C:
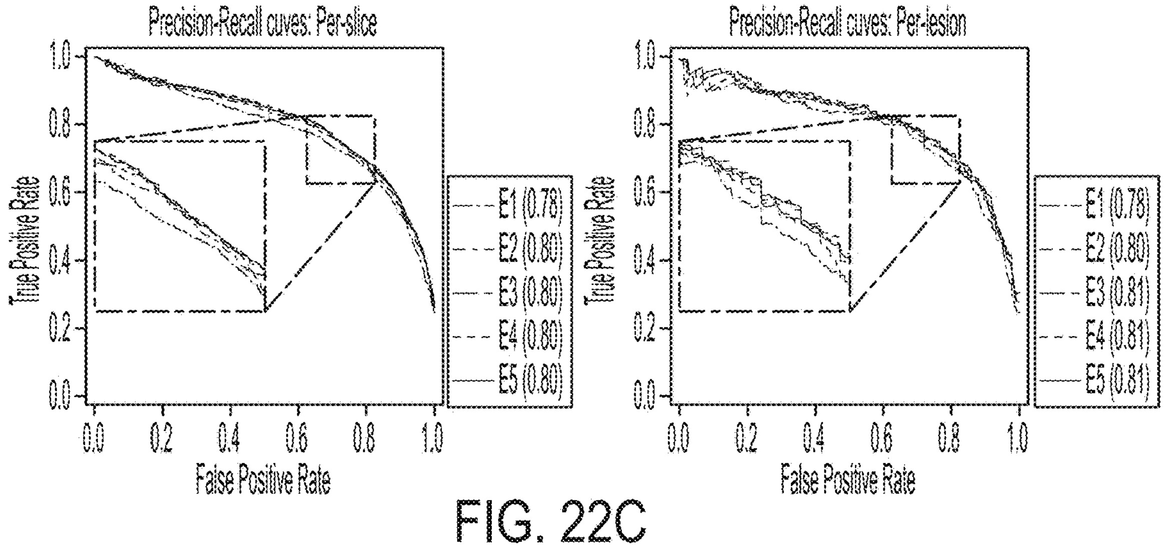

Results for evaluating the proposed ensemble-based approach when varying the number of submodels used in the ensemble prediction are shown in FIG. 22 and Table 13. The ensemble with 3, 4, and 5 submodels (E3-E5) significantly outperform the case when only using one submodel (E1) for prediction on the basis of overall accuracy for per-slice evaluation ($P<0.05$). Results for evaluation metrics of precision, recall and F1 score are also shown in Table 13 and show a similar trend as overall accuracy. ROC curves, AUROC values, Precision-Recall curves, and AUPRC values are shown in FIG. 22*b-c* and Table 13. The ensemble with 5 submodels has the highest AUROC value of 0.95 and the highest AUPRC value of 0.81 for both per-slice and per-lesion evaluation. A portion of the ROC curve and Precision-Recall curve plots in FIG. 22*c-d* is zoomed in to better visually distinguish the performance of each ensemble with varying submodels used for prediction.

TABLE 13

| Model | Accuracy | Precision | Recall | F1 Score | AUROC | AUPRC |
|---|---|---|---|---|---|---|
| | Per-slice evaluation | | | | | |
| E1 | 0.73 (0.71, 0.75) | 0.74 | 0.73 | 0.73 | 0.94 | 0.78 |
| E2 | 0.74 (0.72, 0.76) | 0.75 | 0.74 | 0.74 | 0.94 | 0.80 |
| E3 | 0.75 (0.73, 0.76) | 0.75 | 0.75 | 0.75 | 0.94 | 0.80 |
| E4 | 0.75 (0.74, 0.77) | 0.75 | 0.75 | 0.75 | 0.95 | 0.80 |
| E5 | 0.75 (0.74, 0.77) | 0.76 | 0.75 | 0.75 | 0.95 | 0.81 |
| | Per-lesion evaluation | | | | | |
| E1 | 0.75 (0.71, 0.78) | 0.75 | 0.75 | 0.75 | 0.94 | 0.78 |
| E2 | 0.75 (0.72, 0.79) | 0.76 | 0.75 | 0.75 | 0.95 | 0.80 |
| E3 | 0.76 (0.73, 0.80) | 0.76 | 0.76 | 0.76 | 0.95 | 0.81 |
| E4 | 0.77 (0.73, 0.80) | 0.77 | 0.77 | 0.77 | 0.95 | 0.81 |
| E5 | 0.77 (0.73, 0.80) | 0.77 | 0.77 | 0.76 | 0.95 | 0.81 |

Note:
Values in parenthesis corresponds to 95% confidence intervals.

metrics for both per-slice and per-lesion evaluation (FIG. 21 and Table 12). This highlights the advantage using an ensemble-based DL approach over a single model approach.

Additionally, as the number of submodels used in the ensemble increases, the performance of the proposed ensemble-based approach also increases on the basis of overall accuracy, precision, recall, F1 score, AUROC, and AUPRC for per-slice evaluation (FIG. 22*a* and Table 13). While there is a similar trend for per-lesion evaluation, there is a small drop in performance (not significant) on the basis of overall accuracy, precision, recall and F1 score when comparing the performance of the ensemble with 5 submodels (E5) when compared to that of the ensemble with 4 submodels (E4) (FIG. 22*a*). This suggests that there may be a trade-off between increasing number of submodels used in the ensemble and model performance. An additional tradeoff includes the higher computational resources required to train Discussion The ensemble-based framework classified lesions on $^{18}$F-DCFPyL PET according to the PSMA-RADS categorization when evaluating on both a per-slice and per-lesion basis (FIG. 19 and Table 11) with an overall accuracy of 0.75 and 0.77, respectively, across all PSMA-RADS categories. The proposed ensemble-based method incorporated predictions from multiple submodels to yield more accurate predictions. It was also shown that the proposed ensemble-based approach had higher performance than each individual submodel which make up the ensemble across all accuracy a higher number of submodels which may yield diminishing returns on classification accuracy.

In cases where the proposed ensemble-based framework produced incorrect predictions, the majority of incorrectly classified lesions were classified as belonging to a PSMA-RADS categories that were similar to the true class. For example, of the lesions incorrectly predicted as belonging to PSMA-RADS 1A, the true class membership of 7/8 (87.5%) of those lesions belonged to either the PSMA-RADS 1B or 2 categories (FIG. 19*b*) for per-lesion evaluation. Of the lesions incorrectly predicted as belonging to PSMA-RADS 1B, the true class membership of 13/22 (59.1%) of those lesions belonged to either PSMA-RADS 1A or 2 categories. Of the lesions incorrectly predicted as belonging to PSMA-RADS 2, the true class membership of 8/15 (53.3%) of those lesions belonged to either PSMA-RADS 1A or 1B categories. This suggests that the proposed framework confuses benign lesions with and without uptake and lesions with low uptake in bone or soft tissue sites that are atypical of PCa.

Similarly, the framework tends to misclassify lesion across the PSMA-RADS 4 and 5 categories. Of the lesions incorrectly predicted as belonging to PSMA-RADS 4, the true class membership of 13/22 (59.1%) of those lesions belonged to the PSMA-RADS 5 category. Of the lesions incorrectly predicted as belonging to PSMA-RADS 5, the true class membership of 19/35 (54.3%) of those lesions belonged to the PSMA-RADS 4 category. This suggests that it may be more difficult for the proposed framework to distinguish anatomical abnormalities in lesions with high uptake. Incorporating CT information in these cases may help provide additional anatomic context to help improve classification accuracy. Expanding the proposed method to include the whole imaged PET/CT volume as an input may further improve accuracy by providing a global anatomic context for the lesion. This is especially important for cases where classifying a lesion into a PSMA-RADS category is done in the context of multiple other lesions being present in other anatomic regions of the imaged volume.

The proposed framework can also provide a confidence score as a measure of how certain the framework is about each prediction (FIG. 20). In particular, this confidence score can give insight into cases where the framework has relatively low performance, as in the case with lesions belonging to the PSMA-RADS 3C category (FIG. 19 and FIG. 20). Interestingly, when comparing the boxplots of confidence scores for lesions predicted as belonging to the PSMA-RADS 3C category for per-slice and per-lesion evaluation as shown in FIGS. 20 *c* and *d*, respectively, there is a relatively large downward shift in the distribution of confidence scores for the per-lesion predictions when compared to the per-slice predictions. A reason for this could be that the framework has lower confidence when there is high disagreement in the prediction across multiple slices in a given lesion as well as across submodels in the ensemble. This highlights the advantage of per-lesion evaluation and the ensemble learning-based approach.

Conclusion

An ensemble-based DL and radiomics framework for lesion classification in PSMA PET images of patients with PCa was developed and showed significant promise towards automated classification of PCa lesions. The ensemble learning-based approach had improved performance over individual DL-based submodels. Additionally, a higher number of submodels in the ensemble resulted in higher performance highlighting the effectiveness of the ensemble-based framework. The proposed framework also provides a confidence score that can be used as a measure of how confident the framework is in categorizing lesions into PSMA-RADS categories.

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, devices, systems, computer readable media, and/or component parts or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. A method of classifying a lesion in a medical image of a subject, the method comprising:

extracting one or more image features from at least one region-of-interest (ROI) that comprises the lesion in at least one axial slice of a positron emission tomography (PET) and/or computed tomography (CT) image of at least a portion of the subject using a convolutional neural network (CNN) to generate CNN-extracted image feature data, wherein the at least one axial slice is segmented on a per-slice basis and wherein the portion of the subject that comprises the lesion and at least one segmentation of the lesion are input into the CNN as a binary mask;

extracting one or more radiomic features from the PET and/or CT image to generate radiomic feature data, wherein the one or more radiomic features comprise one or more lesion intensity characteristics and/or one or more morphology characteristics, wherein the one or more lesion intensity characteristics are selected from the group consisting of: a mean and variance of lesion intensity, a mean and variance of lesion background intensity, a lesion-to-background ratio, and a maximum standardized uptake value (SUV) within the lesion, and wherein the one or more morphology characteristics are selected from the group consisting of: a lesion volume, a circularity measure, a solidity measure, and an eccentricity measure;

combining the CNN-extracted image feature data and the radiomic feature data with anatomical location information about the lesion to generate combined information; and, inputting the combined information into an artificial neural network (ANN) that classifies the lesion in the PET and/or CT image using the combined information to generate a classification, thereby classifying the lesion in the medical image of the subject.

2. The method of claim 1, wherein the PET and/or CT image comprises a $^{18}$F-DCFPyL PET and/or CT image.

3. The method of claim 1, wherein the subject has prostate cancer.

4. The method of claim 1, wherein the ROI is cropped substantially around the lesion.

5. The method of claim 1, wherein the ROI comprises a delineated lesion ROI and/or a circular ROI.

6. The method of claim 1, wherein the radiomic features are extracted from the ROI.

7. The method of claim 1, wherein the slice comprises a full field-of-view (FOV).

8. The method of claim 1, wherein the medical image comprises of a prostate of the subject.

9. The method of claim 1, wherein the classification comprises outputting a predicted likelihood that the lesion is in a given prostate-specific membrane antigen reporting and data system (PSMA-RADS) class.

10. The method of claim 1, wherein the classification comprises a confidence score.

11. The method of claim 1, wherein the ANN is fully-connected.

12. The method of claim 1, wherein the anatomical location information comprises a bone, a prostate, a soft tissue, and/or a lymphadenopathy.

13. The method of claim 1, comprising classifying multiple lesions in the subject.

14. The method of claim 1, comprising inputting at least one manual segmentation of the lesion as a binary the binary mask when using the CNN to extract the image features from the ROI.

15. The method of claim 1, comprising:

inputting the axial slice of the PET and/or CT image of at least the portion of the subject that comprises the lesion and at least one segmentation of the lesion as a binary mask into an ensemble of convolutional neural networks (CNNs); and extracting the image features from the ROI from the axial slice of the PET and/or CT image using the ensemble of CNNs to generate the CNN-extracted image feature data.

16. The method of claim 15, wherein the ensemble of CNNs comprises 2, 3, 4, 5, 6, 7, 8, 9, 10, or more submodels.

17. A method of treating a disease in a subject, the method comprising:

extracting one or more image features from at least one region-of-interest (ROI) that comprises the lesion in at least one axial slice of a positron emission tomography (PET) and/or computed tomography (CT) image of at least a portion of the subject using a convolutional neural network (CNN) to generate CNN-extracted image feature data, wherein the at least one axial slice is segmented on a per-slice basis and wherein the portion of the subject that comprises the lesion and at least one segmentation of the lesion are input into the CNN as a binary mask;

extracting one or more radiomic features from the PET and/or CT image to generate radiomic feature data, wherein the one or more radiomic features comprise one or more lesion intensity characteristics and/or one or more morphology characteristics, wherein the one or more lesion intensity characteristics are selected from the group consisting of: a mean and variance of lesion intensity, a mean and variance of lesion background intensity, a lesion-to-background ratio, and a maximum standardized uptake value (SUV) within the lesion, and wherein the one or more morphology characteristics are selected from the group consisting of: a lesion volume, a circularity measure, a solidity measure, and an eccentricity measure;

combining the CNN-extracted image feature data and the radiomic feature data with anatomical location information about the lesion to generate combined information;

inputting the combined information into an artificial neural network (ANN) that classifies the lesion in the PET and/or CT image using the combined information to generate a classification; and, administering, or discontinuing administering, one or more therapies to the subject based at least in part upon the classification, thereby treating the disease in the subject.

18. A system, comprising at least one controller that comprises, or is capable of accessing, computer readable media comprising non-transitory computer executable instructions which, when executed by at least one electronic processor, perform at least:

extracting one or more image features from at least one region-of-interest (ROI) that comprises a lesion in at least one axial slice of a positron emission tomography (PET) and/or computed tomography (CT) image of at least a portion of a subject using a convolutional neural network (CNN) to generate CNN-extracted image feature data, wherein the at least one axial slice is segmented on a per-slice basis and wherein the portion of the subject that comprises the lesion and at least one segmentation of the lesion are input into the CNN as a binary mask;

extracting one or more radiomic features from the PET and/or CT image to generate radiomic feature data, wherein the one or more radiomic features comprise one or more lesion intensity characteristics and/or one or more morphology characteristics, wherein the one or more lesion intensity characteristics are selected from the group consisting of: a mean and variance of lesion intensity, a mean and variance of lesion background intensity, a lesion-to-background ratio, and a maximum standardized uptake value (SUV) within the lesion, and wherein the one or more morphology characteristics are selected from the group consisting of: a lesion volume, a circularity measure, a solidity measure, and an eccentricity measure;

combining the CNN-extracted image feature data and the radiomic feature data with anatomical location information about the lesion to generate combined information; and, inputting the combined information into an artificial neural network (ANN) that classifies the lesion in the PET and/or CT image using the combined information to generate a classification.

* * * * *